United States Patent
Raykov et al.

(10) Patent No.: US 10,607,147 B2
(45) Date of Patent: Mar. 31, 2020

(54) ESTIMATING A NUMBER OF OCCUPANTS IN A REGION

(71) Applicant: ARM LIMITED, Cambridge (GB)

(72) Inventors: Yordan Petrov Raykov, Birmingham (GB); Emre Özer, Buckden (GB); Ganesh Suryanarayan Dasika, Austin, TX (US)

(73) Assignee: ARM Limited, Cambridge (GB)

(*) Notice: Subject to any disclaimer, the term of this patent is extended or adjusted under 35 U.S.C. 154(b) by 206 days.

(21) Appl. No.: 15/182,901

(22) Filed: Jun. 15, 2016

(65) Prior Publication Data
US 2017/0364817 A1    Dec. 21, 2017

(51) Int. Cl.
| | | |
|---|---|---|
| G06F 17/18 | (2006.01) | |
| G06F 19/00 | (2018.01) | |
| G06N 7/00 | (2006.01) | |
| G06N 20/00 | (2019.01) | |
| G06Q 50/16 | (2012.01) | |
| G06Q 10/00 | (2012.01) | |
| G01J 5/00 | (2006.01) | |

(52) U.S. Cl.
CPC ............ G06N 7/005 (2013.01); G01J 5/0025 (2013.01); G06N 20/00 (2019.01); G06Q 10/00 (2013.01); G06Q 50/16 (2013.01)

(58) Field of Classification Search
CPC ..... G06N 7/005; G06N 99/005; G01J 5/0025; G06Q 10/00; G06Q 50/16
USPC ........................................................ 702/181
See application file for complete search history.

(56) References Cited

U.S. PATENT DOCUMENTS

| | | | | |
|---|---|---|---|---|
| 2004/0078145 A1* | 4/2004 | Ostoich | ................. | G16H 10/40 |
| | | | | 702/19 |
| 2012/0066168 A1* | 3/2012 | Fadell | .................... | G05B 15/02 |
| | | | | 706/52 |
| 2013/0115821 A1* | 5/2013 | Golko | ................. | H01R 13/516 |
| | | | | 439/638 |
| 2013/0201316 A1* | 8/2013 | Binder | ................... | H04L 67/12 |
| | | | | 348/77 |
| 2014/0032150 A1* | 1/2014 | Follett | ............... | G01R 13/0263 |
| | | | | 702/79 |
| 2014/0358592 A1* | 12/2014 | Wedig | ................... | G06Q 40/08 |
| | | | | 705/4 |
| 2015/0137967 A1* | 5/2015 | Wedig | ................. | G08B 25/016 |
| | | | | 340/501 |
| 2016/0077197 A1* | 3/2016 | Vangeel | ............. | G01S 7/52001 |

(Continued)

FOREIGN PATENT DOCUMENTS

| | | | | |
|---|---|---|---|---|
| GB | 2519769 | 5/2015 | | |
| WO | 2014/177404 | 11/2014 | | |
| WO | WO-2017216511 A1 * | 12/2017 | ............ | G06N 20/00 |

OTHER PUBLICATIONS

Y. Agarwal et al, "Occupancy-Driven Energy Management for Smart Building Automation" *BuildSys 2010*, Nov. 2, 2010, pp. 1-6.

(Continued)

*Primary Examiner* — Michael P Nghiem
(74) *Attorney, Agent, or Firm* — Nixon & Vanderhye P.C.

(57) ABSTRACT

A method for estimating a number of occupants in a region comprises receiving a time series of sensor values detected over a period of time by a motion sensor sensing motion in the region. A spread parameter indicative of the spread of the sensor values is determined. The number of occupants in the region is estimated based on the spread parameter.

23 Claims, 11 Drawing Sheets

(56) References Cited

U.S. PATENT DOCUMENTS

2016/0234916 A1* 8/2016 Mans ............... H05B 37/0227
2016/0261991 A1* 9/2016 Yamada ............... H04W 4/029

OTHER PUBLICATIONS

E.L. Andrade et al, "Hidden Markov Models for Optical Flow Analysis in Crowds" *Proceedings of the 18th International Conference on Pattern Recognition (ICPR '06)*, Aug. 20, 2006, pp. 460-463.

M. Beal et al, "The Infinite Hidden Markov Model" *Advances in Neural Information Processing Systems*, Nov. 2002, pp. 577-584.

Z. Bitvai et al, "Non-Linear Text Regression with a Deep Convolutional Neural Network" *Proceedings of the 53rd Annual Meeting of the Association for Computational Linguistics and the 7th International Joint Conference on natural Language Processing (Short Papers)*, Jul. 26-31, 2015, pp. 180-185.

R.A. Brooks, "The Intelligent Room Project" *Cognitive Technology, Humanizing the Information Age, Proceedings, Second International Conference*, 1997 IEEE, Aug. 25-28, 1997, pp. 271-278.

A.B. Chan et al, "Counting People with Low-Level Features and Bayesian Regression" *Transactions on Image Processing, IEEE* 21(4) Oct. 2011, pp. 1-14.

P.-C. Chung et al "A daily behavior enabled hidden Markov model for human behavior understanding" *Pattern Recognition*, vol. 41, Issue 5, May 2008, pp. 1572-1580.

R.H. Dodier et al, "Building occupancy detection through sensor belief networks" *Energy and Buildings*, vol. 38, Sep. 2006, pp. 1033-1043.

V.L. Erickson et al, "Energy Efficient Building Environment Control Strategies Using Real-time Occupancy Measurements" *Proceedings of the First ACM Workshop on Embedded Sensing Systems for Energy-Efficiency in Buildings*, Nov. 3, 2009, pp. 19-24.

D. Gao et al, "Behavioral Distance Measurement Using Hidden Markov Models" *Recent Advances in Intrusion Detection*, Sep. 2006, pp. 19-40.

K. Hashimoto et al, "People Count System Using Multi-Sensing Application" *International Conference on Solid State Sensors and Actuators, Transducers '97*, Jun. 16-19, 1997, pp. 1291-1294.

L. Kang et al, "Convolutional Neural Networks for No-Reference Image Quality Assessment" *Proceedings of the IEEE Conference on Computer Vision and Pattern Recognition*, Jun. 2014, pp. 1733-1740.

A. Khan et al, "Occupancy Monitoring using Environmental & Context Sensors and a Hierarchical Analysis Framework" *ACM International Conference on Embedded Systems for Energy-Efficient Buildings*, Nov. 5-6, 2014, pp. 90-99.

J.A. Kientz et al, "The Georgia Tech Aware Home" *CHI '08 extended abstracts on Human factors in computing systems*, Apr. 5-10, 2008, pp. 3675-3680.

K.P. Lam et al, "Occupancy Detection Through an Extensive Environmental Sensor Network in an Open-Plan Office Building" *IBPSA Building Simulation, Eleventh International IBPSA Conference*, Jul. 27-30, 2009, pp. 1452-1459.

S. Lee et al, "A Pyroelectric Infrared Sensor-based Indoor Location-Aware System for the Smart Home" *IEEE Transactions on Consumer Electronics*, vol. 52, No. 4, Nov. 2006, pp. 1311-1317.

V. Lempitsky et al, "Learning to Count Objects in Images" *Advances in Neural Information Processing Systems*, Dec. 2010, pp. 1-9.

X. Liu et al, "Detecting and Counting People in Surveillance Applications" *IEEE Conference on Advanced Video and Signal Based Surveillance, AVSS*, Sep. 15-16, 2005, pp. 306-311.

A. Mannini et al, "Gait phase detection and discrimination between walking-jogging activities using hidden Markov models applied to foot motion data from a gyroscope" *Gait & Posture*, vol. 36, Sep. 2012, pp. 657-661.

E. Mathews et al, "Evaluation of a 'Smart' Pedestrian Counting System Based on Echo State Networks" *EURASIP Journal on Embedded Systems*, vol. 2009, Article ID 352172, Jan. 2009, 9 pages.

S. Meyn et al, "A Sensor-Utility-Network Method for Estimation of Occupancy in Buildings" *Proceedings of the 48th IEEE Conference on Decision and Control*, Dec. 16-18, 2009, pp. 1494-1500.

M. Moghavvemi et al, "Pyroelectric Infrared Sensor for Intruder Detection" *IEEE Region 10 Conference, TENCON 2004*, vol. 500, Nov. 24, 2004, pp. 656-659.

D. Pathak et al, "Constrained Structured Regression with Convolutional Neural Networks" *arXiv preprint arXiv:1511.07497*, Nov. 23, 2015, pp. 1-10.

Y.P. Raykov et al, "Iterative collapsed MAP inference for Bayesian nonparametrics" *NIPS 2015 Workshop: Bayesian Nonparametrics: The Next Generation*, Dec. 2015, pp. 1-6.

H. Drucker et al, "Support Vector Regression Machines" *Advances in Neural Information Processing Systems*, May 1997, pp. 155-161.

Y.W. Teh et al, "Hierarchical Dirichlet Processes" *Journal of the American Statistical Association*, vol. 101, Issue 476, Journal publication date in 2006, paper includes a date of Nov. 15, 2005, pp. 1-30.

B.Ugur Toreyin et al, "Flame Detection System Based on Wavelet Analysis of PIR Sensor Signals with an HMM Decision Mechanism" *16th European Signal Processing Conference (EUSIPCO 2008)*, Aug. 25-29, 2008, pp. 1-5.

J. Van Gael et al, "Beam Sampling for the Infinite Hidden Markov Model" *Proceedings of the 25th International Conference on Machine Learning*, Jul. 5, 2008, pp. 1088-1095.

T. van Oosterhout et al, "Head Detection in Stereo Data for People Counting and Segmentation" *VISAPP 2011, Proceedings of the Sixth International Conference on Computer Vision Theory and Applications*, Mar. 5-7, 2011, pp. 620-625.

F. Wahl et al, "A distributed PIR-based approach for estimating people count in office environments" *IEEE 15th International Conference on Computational Science and Engineering*, IEEE, Dec. 5, 2012, pp. 640-647.

D.B. Yang et al, "Counting People in Crowds with a Real-Time Network of Simple Image Sensors" *9th IEEE International Conference on Computer Vision*, IEEE, Oct. 13, 2003, pp. 122-129.

J. Yun et al, "Human Movement Detection and Identification Using Pyroelectric Infrared Sensors" *Sensors 2014*, vol. 14, May 5, 2014, pp. 8057-8081.

P. Zappi et al, "Enhancing the Spatial Resolution of Presence Detection in a PIR Based Wireless Surveillance Network" *IEEE Conference on Advanced Video and Signal Based Surveillance*, IEEE, Sep. 5, 2007, pp. 295-300.

P. Zappi et al, "Tracking Motion Direction and Distance With Pyroelectric IR Sensors" *IEEE Sensors Journal*, vol. 10, No. 9, Sep. 2010, pp. 1486-1494.

International Search Report and Written Opinion of the International Searching Authority dated Jul. 6, 2017 in PCT/GB2017/050978, 11 pages.

A. Yang et al, "A Multi-Sensor Based Occupancy Estimation Model for Supporting Demand Driven HVAC Operations" Apr. 16, 2015, retrieved May 31, 2017 from http://i-lab.usc,edu/documents/Publications/2012_A Multi-Sensor Based Occupancy Estimation Model for Supporting Demand, pp. 49-56.

* cited by examiner

ESTIMATING A NUMBER OF OCCUPANTS IN A REGION

BACKGROUND

Technical Field

The present technique relates to estimating a number of occupants in a region.

Technical Background

There are a number of applications where it can be useful to provide automated estimation of the number of occupants in a particular region. For example, there is an increasing interest in designing smart buildings or other human living environments which can react to the behaviour of the inhabitants of the building, for example by controlling lighting, heating or air conditioning systems based on the number of occupants detected in a room or other region of the building. However, existing systems for estimating the number of occupants are relatively complex and/or require a network of multiple sensors to monitor the region of interest. In addition to being relatively expensive, such systems are also relatively complex to install since their accuracy may be highly dependent on their physical siting in the region of interest, and hence this usually requires costly specialist installation.

SUMMARY

At least some examples provide a method for estimating a number of occupants in a region, comprising:
receiving a series of sensor values detected over a period of time by at least one motion sensor for sensing motion in said region;
determining a spread parameter indicative of a spread of the sensor values detected over said period of time; and
estimating the number of occupants in the region in dependence on said spread parameter.

At least some examples provide a data processing apparatus comprising processing circuitry configured to perform the method discussed above.

At least some examples provide a computer-readable storage medium storing a computer program to control a data processing apparatus to perform the method discussed above. The storage medium may be a non-transitory storage medium.

At least some examples provide a system comprising:
at least one motion sensor to sense motion in a region and to output a series of sensor values over a period of time; and
processing circuitry to determine a spread parameter indicative of a spread of the sensor values detected over said period of time, and in dependence on said spread parameter, to estimate a number of occupants in the region.

Further aspects, features and advantages of the present technique will be apparent from the following description of examples, which is to be read in conjunction with the accompanying drawings.

DESCRIPTION OF EXAMPLES

Some specific examples are discussed below. It will be appreciated that the invention is not limited to these particular examples.

The examples below provide a method for estimating a number of occupants within a region based on a series of sensor values detected over a period of time by at least one motion sensor for sensing motion in the region of interest. The inventors recognised that the spread of sensor values detected over the period of time correlates to the number of occupants in the region, so that an estimate of the number of occupants can be provided based on the output of the at least one motion sensor. This allows an automated technique for estimating the number of occupants to be provided which uses less complex components and is less complex to install, greatly reducing the cost of providing such an estimate.

In one example, the technique can estimate the number of occupants based on the output of just a single passive infrared (PIR) sensor for sensing infrared radiation from the region of interest. As simple PIR sensors can currently be obtained for less than $10, this allows much lower cost than alternative techniques using visible light cameras or high resolution thermal cameras or more complex systems using a network of multiple sensors tracking entry/exit points of the region.

Nevertheless, the technique can also be applied to sensor data captured by two or more PIR sensors, if desired. This may still be more cost effective as the approach of estimating the number of occupants based on the spread of the sensor values means the estimation is less sensitive to specific positioning of the sensors, reducing installation costs.

Also, the technique of estimating the number of occupants in a region based on the spread of sensor values may also be applied to other types of motion sensor, not just a PIR sensor. For example, the at least one motion sensor may comprise an active sensor, which emits radiation into the region and senses motion based on reflection of the emitted radiation from the region. In particular, the active sensor could be any of the following:

an active infrared sensor, which emits infrared radiation into the region and senses motion based on reflection of the emitted infrared radiation;

a microwave motion sensor, which emits microwave radiation into the region and senses motion based on reflection of the emitted microwave radiation; or an ultrasonic motion sensor, which emits ultrasound radiation into the region and senses motion based on reflection of the emitted ultrasound radiation.

For ease of explanation, the following examples describe the technique in the context of a PIR sensor, but it will be appreciated that the same technique could be applied to any of the types of motion sensor discussed above. In some examples, a combination of two or more different types of sensor (e.g. one PIR sensor and one ultrasound sensor) could be used.

Figure 1:
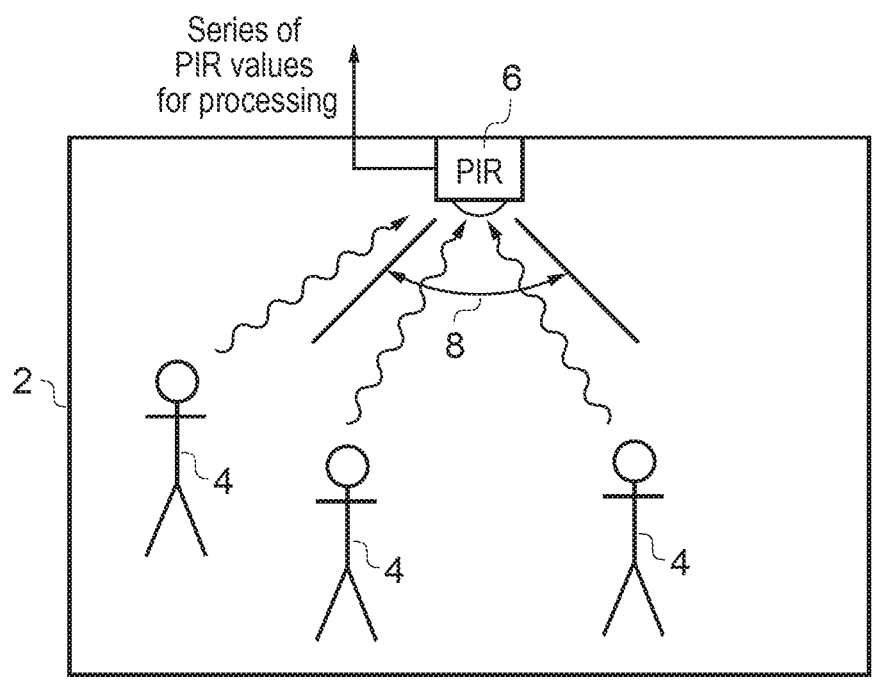
FIG. 1 shows an example of estimating the number of occupants in a region using a single passive infrared (PIR) sensor.

FIG. 1 shows an example of a room 2 containing a number of occupants 4. A PIR sensor 6 is provided to sense infrared radiation within the room 2. In this example the sensor 6 is mounted on the ceiling of the room. Alternatively, the PIR sensor 6 could be provided in other locations, such as on the wall or on a table or other support within the room 2. One advantage of the present technique is that it has been found to be relatively robust and tolerant to different positioning of the PIR sensor 6.

A passive infrared (PIR) sensor generates an output value which depends on the amount of infrared (IR) radiation that is incident on the sensor. More particularly, the PIR sensor output is typically dependent on variation in the amount of incident IR radiation. Unlike thermal imaging cameras which produce a 2D image of pixels whose intensities correspond to the infrared radiation detected from each part of the view shown in the image, a PIR sensor does not attribute the detected radiation to any particular position within its field of view, but simply outputs a value dependent on the amount of infrared radiation detected. A PIR sensor is passive in the sense that it does not emit any light or radiation itself, but merely detects radiation emitted by other sources within the range of the sensor. All objects radiate black body radiation across a range of wavelengths, and the power radiated at each wavelength depends on the object's temperature. The peak wavelength (the wavelength at which greatest power is radiated) varies inversely with temperature. For humans and other animals at standard body temperature, black body radiation is strongest in the far infrared region and so as occupants move across the field of view 8 of the PIR sensor 6, the change in temperature between room temperature and body temperature within the sensor's field of view can be detected from the resulting change in the incoming infrared radiation. The PIR converts the detected amount of radiation to an output voltage, which is output as PIR sensor data. The PIR sensor could be an analogue sensor which outputs a voltage whose analogue level represents the amount of detected radiation, or a digital sensor which outputs a binary value representing the detected level of infrared radiation. For a digital sensor, the PIR sensor 6 outputs PIR values at a given sampling rate (e.g. 1-30 samples per second) to provide a time series of PIR sensor values which can be stored in a memory or other data store or analysed by a processor. In the case of an analogue sensor, the PIR sensor 6 may output a time varying voltage (which can be considered to implicitly provide a series of sensor values), and a downstream analogue-to-digital converter provided outside the sensor may sample the voltage at a given sampling rate and output a time series of digital values. PIR sensors are commonly employed in buildings for human motion detection, such as for triggering burglar alarms or for controlling switching on of lights when motion is detected. However, conventionally the PIR sensor merely provides a binary indication of whether or not any occupants are detected in the region surrounding the PIR sensor (a simple yes/no as to whether anyone is present), without estimating how many individuals are present.

The present technique extends the use of the PIR sensor (or other types of motion sensor as discussed above) to provide a quantitative estimate of the number of occupants detected in the region in which the sensor is provided. The region of interest may be a space with relatively well-defined boundaries, such as a room, courtyard or other confined space. However, the technique could also be used for less well-defined regions, e.g. the region of interest could simply be the vicinity of the PIR sensor, without being demarked with walls or other boundaries. The occupants being detected may typically be human beings, but could also be other non-human animals such as livestock or pets.

In general, the technique is based on the observation that the spread of the sensor values detected by the motion sensor over a period of time correlates to the number of occupants in the region. In this regard, the "spread" refers to a parameter indicating of an amount of variation over time within the obtained series of sensor values. More particularly, the spread refers to the width of the distribution of frequencies of occurrence of different sensor values within the obtained series. It has been found that in regions comprising a larger number of occupants, there will be typically be a greater spread in the sensor values than in regions with fewer occupants, and surprisingly this correlation is strong and consistent enough that reasonable estimates of the occupancy count in a given region can be made. The estimate is approximate in the sense that the occupancy count is determined with an error bound—the occupancy count does not need to be exact. Nevertheless, for applications where 100% accuracy is not required (e.g. controlling lighting or air conditioning/heating systems in a building), this estimate can be sufficient and the cost savings of allowing estimation of the number of occupants based on the output of a single motion sensor can be considerable.

This correlation is surprising, as one may expect that a single motion sensor could not distinguish a localised pattern of motion by one individual from motions representative of the group of individuals as a whole. However, in practice, by collecting data from a range of environments, range of occasions with different numbers of attendees, and testing over different time windows as discussed below, a sufficiently strong correlation has been found to enable a reasonable estimate to be made. The correlation can be explained for example by the fact that a greater number of occupants will tend to have a wider range of body temperatures as well as varying types of motion compared to a smaller number of individuals, leading to a wider spread of detected sensor values.

There are a number of ways in which the spread parameter can be determined from the detected series of sensor values. For example, the spread parameter could be based on the variance or standard deviation of the sensor values.

However, in many cases the sensor values will approximately tend to follow a statistical probability distribution, which describes the relative frequency with which different possible values of sensor values occur within the series captured in a given time. Typically the probability distribution may be characterised by a location parameter indicative of the peak of the probability distribution (the most likely sensor value to be detected), and a spread parameter indicative of how wide the probability distribution is (how quickly the frequencies of the sensor values drop either side of the peak). A probability distribution with a lower spread will typically have more values clustered around the most common sensor value, while a probability distribution with a higher spread will have a lower central peak and a fatter tail on either side of the peak. Hence, in some cases the spread parameter can be estimated by fitting a probability distribution to the detected sensor values, and determining a parameter indicating the spread of the fitted probability distribution as the spread parameter to be used for estimating the number of occupants.

Various probability distributions can be used, for example a Gaussian distribution, Gumbel distribution, Laplace distribution or other kinds of probability distribution. In testing, the spread of the Laplace distribution was found to provide the greatest accuracy in estimating the number of occupants, but a Gaussian also provided a reasonable prediction. The Laplace distribution can also be referred to as a double exponential distribution since it comprises two exponential distributions spliced back to back. The fitting of the Laplace distribution to a series of sensor values can be performed as follows:

the location parameter $\mu$ is determined equal to the median value among the sensor values detected in the monitored period of time the spread parameter b is set based on the following:

$$b = \frac{1}{N}\sum_i |x_i - \mu|$$

where N is the total number of sensor values captured in the monitored period of time, $x_i$ are the respective sensor values, and $\mu$ is the location parameter determined as above.

Having calculated the spread parameter b for the captured series of sensor values, this can then be mapped to an estimate of the number of occupants in the region surrounding the motion sensor.

The accuracy of occupancy count detection will tend to be higher for longer periods of time than shorter periods of time, since local fluctuations of sensor values caused by motion of particular individuals will tend to even themselves out over a longer period of time. Hence, for the greatest accuracy the sensor values could be collected over a long time or during the entire period for which the individuals are present in the region of interest. For example, during a meeting lasting for one hour, a single time series of sensor values can be captured over the entire hour, and the spread parameter of that series detected and mapped to the occupancy count to provide the greatest accuracy.

However, for many applications it may be desirable to provide an estimate of the number of occupants sooner, for example while the meeting or other event associated with the presence of the occupants is still ongoing. For example in a smart building application it may be desirable to be able to control systems such as lighting or air conditioning to adapt to the number of occupants present, and it may be too late if one waits until the occupants have left before estimating the number of occupants. Hence, to provide faster response in controlling systems based on the estimated occupancy, it may be preferable to use shorter series of sensor values. In this case, the number of occupants may be estimated repeatedly over successive windows of time, with each estimation being based on the sensor values detected in the corresponding window of time. While calculating the number of occupants for the most recently detected window of sensor data, the sensor values for the next window can be gathered by the motion sensor.

Once the spread parameter has been determined for a given window of time, the estimated number of occupants can be determined by applying a regression model which maps the spread parameter to the number of occupants. For example, the regression model may be defined in terms of an algorithm, process or equation by which the number of occupants can be predicted from the spread parameter. To train the model, a number of sets of sensor values are gathered in meetings with different known numbers of occupants, so that the spread parameters gathered for each meeting (or over each time window within the same meeting) can be plotted against the known numbers of occupants in each case. Any known regression technique can be used to fit a regression model to the detected sensor values and numbers of attendees, to yield a trained model with coefficients defining the relationship between the spread parameters and the numbers of occupants. The trained model can then be applied to subsequently detected spread parameters to predict the number of occupants in regions containing unknown numbers of occupants.

Different regression models could be used depending on the required accuracy and energy consumption for a particular application. Relatively simple regression models such as a linear regression model or log-linear regression model can be cheaper to implement in a hardware device, but more complex regression models such as support vector regression, kernel regression, Gaussian process regression or convolutional neural networks can provide greater accuracy.

In some examples the same type of regression model may be used for all predictions of the number of occupants. However, it has been found that the scaling of the spread parameters with the number of occupants behaves differently depending on whether the number of occupants is low or high. Hence, it can be useful to provide at least two different regression models for mapping the spread parameter to an estimated number of occupants and to select which particular regression model to use based on either the detected spread parameter or the number of occupants which have previously been estimated to be present within the region. In particular, it has been found that at relatively low numbers of occupants, the spread parameters scale relatively linearly with the number of occupants, but at higher numbers of occupants the increase in the spread parameter with increasing number of occupants becomes slower, and so a log-linear regression model can provide greater accuracy. One explanation for this is that when the number of occupants becomes higher, then it is more likely that one occupant's motion is occluded from the view of the sensor by another occupant passing between the first occupant and the sensor, and that the sensor output becomes saturated if there is more than a certain amount of motion. If there is more occlusion then it is less likely that the sensor will see the full range of motions of all of the occupants, leading to the spread of values increasing more and more slowly as the number of occupants becomes higher.

Hence, a first regression model may be selected when the detected spread parameter or a previously estimated number of occupants is less than a given threshold, and a second regression model may be selected when the spread parameter or a previously estimated number of occupants is greater than the threshold. For example, the first regression model may be the linear regression model and the second regression model may be the log-linear regression model.

Alternatively, the selection of which regression model can be made based on the observations made in previous windows of time. If, in more than a first number of previous windows of time, the number of occupants is estimated using the first regression model as being greater than a first threshold, then the method may switch to using the second regression model for a subsequent window of time. Conversely, if the number of occupants estimated using the second regression model is less than a second threshold for more than a second number of previous windows of time, then the method may switch to using the first regression model for a subsequent window. A counter may be used to track the number of windows for which occupancy counts beyond the threshold have been detected (e.g. it can be incremented when the threshold condition is satisfied and decremented when the threshold condition is not satisfied, and the switch of regression models can be triggered when the counter reaches a certain value). The first and second numbers of windows may be the same, and the first/second threshold numbers of occupants may be the same, in which case the switching between the first/second models is symmetric. Alternatively, the switching may be asymmetric with different threshold occupancy counts or numbers of previous windows required to satisfy the threshold before switching to the first or second regression models respectively, so that the system may be biased towards using one or other of the first and second models.

The spread parameter can be determined based on the raw sensor values output directly by the sensor, and this can provide sufficient accuracy especially when calculating the occupancy count using the sensor values captured in a relatively long window of time.

However, if it is desired to determine the occupancy count over shorter windows of sensor data, there may be some variation in the spread parameters estimated for respective windows of time even if the number of occupants in the region does not change. This is because shorter time segments of sensor data are more strongly influenced by short-term individual behaviour caused by particular motions of individual occupants which is not representative of the current number of occupants as a whole. This issue can be addressed by excluding selected sensor values from the determination of the spread parameter so that the spread parameter is determined only based on the remaining sensor values.

In particular, the method may include clustering segments of sensor values into a number of clusters, with a given cluster comprising segments of sensor values which have similar properties, and then excluding segments of sensor values which correspond to one or more selected clusters when determining the spread parameter. For example, by testing during the training phase, the clusters of patterns of sensor data which do not correlate strongly to the number of occupants can be identified, and such clusters can be excluded from the estimation of the spread parameters. The clusters to be excluded can be identified during a training phase for example by comparing series of sensor values detected in occupied regions with series of sensor values detected in unoccupied regions, and assuming that the patterns of sensor values which occur only in occupied regions are not representative of the number of occupants as they describe individual (local) behaviour and so should be excluded from the calculation of the spread parameter. By excluding portions of the series of sensor values which are not expected to correlate to the number of occupants, the accuracy obtained using remaining segments of sensor values can be increased and the variation in the spread parameters detected for successive time windows in the same meeting can be reduced.

While it is possible to perform the clustering based just on certain predefined criteria, it can be particularly useful for the clustering to be performed using a machine learning model that is trained from data. For example, the hidden Markov model (HMM) or infinite hidden Markov model (IHMM) may be used (although other machine learning models could also be used).

Using a machine learning model allows greater interpretability of the produced segmentation of the time series of sensor data, which allows for more efficient behaviour analysis. Furthermore, when nonparametric model is used, the number of the different behaviours and their complexity can be learned from the incoming data, in a streaming fashion. In particular, it has been found that the iHMM is particularly useful because it adapts its complexity to the structure in the data and is able to continue adapting the model not only during the initial training phase but also when the system is being used in the field with the clusters continuing to be adapted as more sensor data is collected.

During training of the machine learning model, a first inference technique can be used to learn model parameters from the training data. Subsequently, when the model is adapted to further data in the field, a second inference technique different to the first inference technique can be used. For example, the first inference technique may comprise a Markov Chain Monte Carlo inference technique, Beam sampling inference technique or Gibbs sampling inference technique, and the second inference technique may comprise an iterative maximum-a-posteriori inference technique. The first inference technique may provide greater accuracy but be more computationally intensive, while the second inference technique may be more computationally efficient. By using different inference techniques during training and test phases, this allows the device provided in the field to use less memory and have reduced computation time, while still enabling greater predictive accuracy by using the more accurate first inference technique during training when the computational burden required is less of a factor as this can be done offline using a more powerful computer.

The training of both the regression model for mapping the spread parameters to the occupancy count and the clustering model may be based on training data collected across a number of different rooms or regions, different numbers of occupants and different times of day, temperatures or other environmental conditions to provide a model which is robust to different conditions and can provide a relatively accurate prediction across the different conditions.

Figure 2:
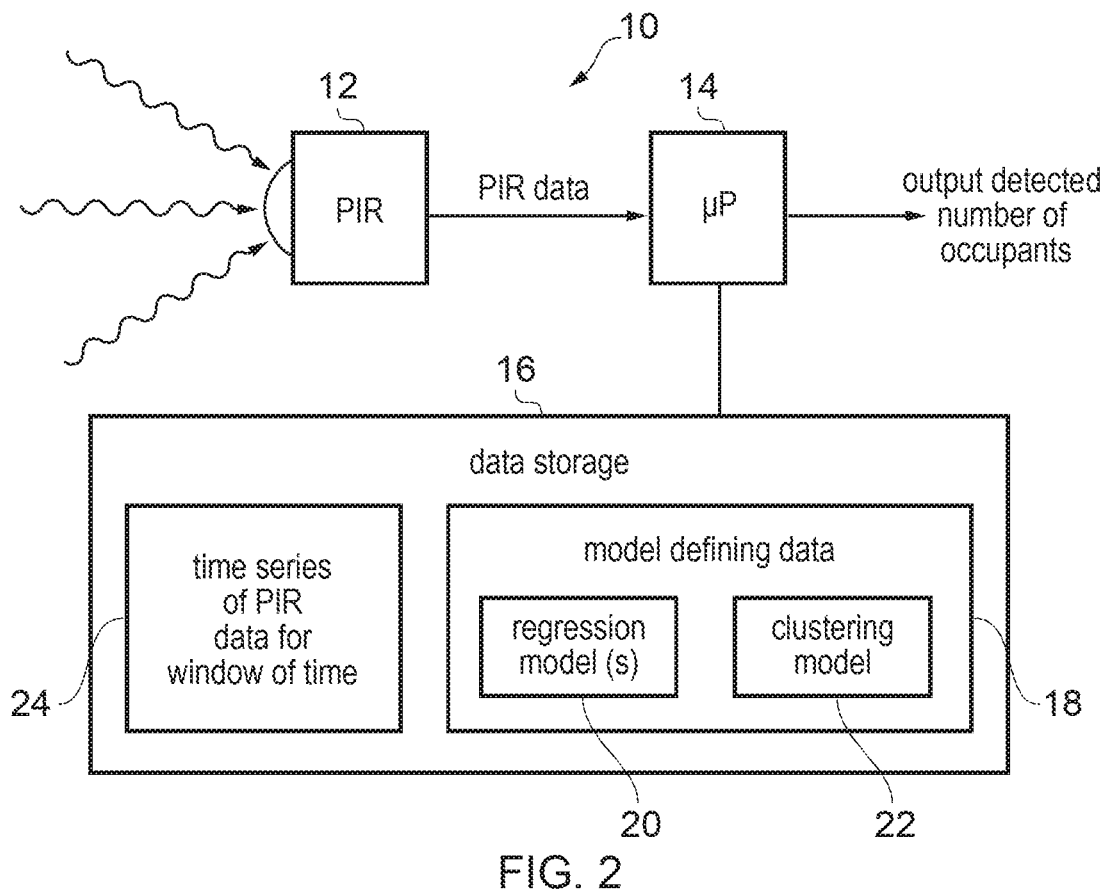
FIG. 2 shows an example of a system for estimating a number of occupants in a region.

FIG. 2 shows an example of a system 10 for detecting the number of occupants in a region. The system includes a passive infrared sensor 12, processing circuitry 14 (in this example a microprocessor) and data storage circuitry 16 (e.g. a memory). The data storage 16 stores model defining data 18 defining one or more regression models 20 and a clustering model 22 used to estimate the number of occupants in the region. For example, the regression model parameters may include coefficients defining the relationship between the spread of detected PIR values and corresponding number of occupants, while the clustering model 22 may be defined in terms of transition probabilities and initial state probabilities for a probabilistic model such as the iHMM, as well as an indication of which clusters of segments of PIR data should be excluded from the calculation of the spread. The data storage may also store one or more time series 24 of PIR sensor values detected by the sensor 12 for successive windows of time. During a given window of time, the PIR data being gathered by the sensor 12 may be written to the data storage 16 while in parallel the processing circuitry 14 processes the time series data captured for a preceding window of time according to the models 18 to estimate the number of occupants for that previous window. Alternatively, if it is possible to estimate the spread parameter based on running totals of PIR values supplied sequentially from the sensor without needing to see the overall set of values in the time window, then it may not be necessary to store any PIR data in the data storage 16. For example, some probability distribution parameters may depend on the sum of all the PIR values captured in the window of time and so these could simply be added as they are received without storing. However, if parameters such as the median of the detected values for a given window of time are used then this may require the window of PIR data to be stored so that they can be sorted to identify the median.

The processing circuitry 14 can be embedded in the same circuit board as the PIR sensor 12 or could be separate. In some cases the processing circuitry 14 may be an embedded unit provided within the building fabric in which the number of occupants are being detected. Alternatively, the processing circuitry 14 and data storage 16 may be separate from the room or other region provided with the PIR sensor 12. For example, the functionality of the processing circuitry 14 could be implemented on a central building control system or server somewhere remote from the region in which the sensing is being performed. The data storage 16 may store software providing program instructions for controlling the processing circuitry 14 to calculate the estimated number of occupants according to the method discussed below. The estimated number of occupants can be written back to the data storage 16 or output to a remote device, e.g. over a network.

Figure 3:
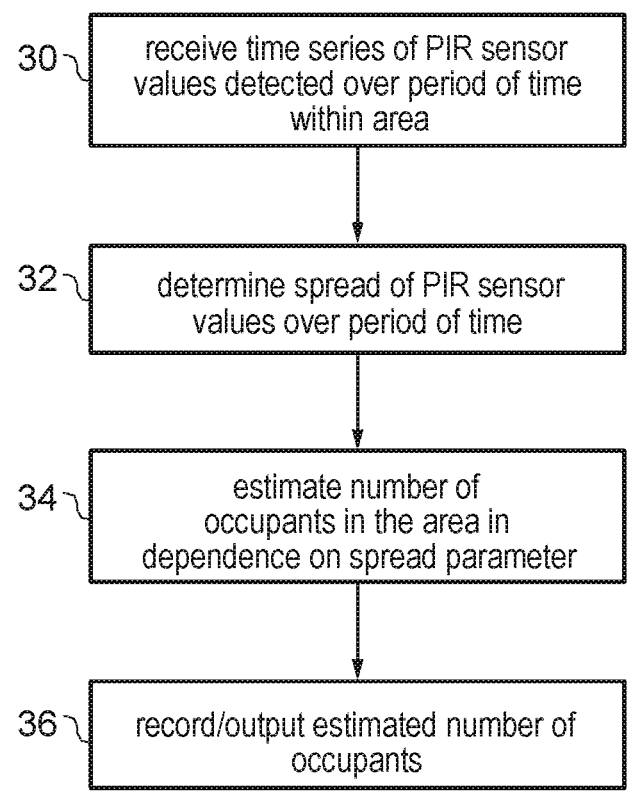
FIG. 3 shows a flow diagram illustrating a method of estimating a number of occupants in a region.

FIG. 3 is a flow diagram illustrating a method of estimating the number of occupants. At step 30 the processing circuitry 14 receives a time series of passive infrared sensor values detected over a period of time within the region of interest. At step 32 the processing circuitry 14 determines the spread of PIR sensor values within that period of time, for example the spread of a Laplace distribution fitted to the observed values in the monitored time period. At step 34 the number of occupants in the region is estimated based on the spread parameter, for example by applying a trained regression model 20. At step 36 the estimated number of occupants is output to an external device and/or recorded in the data storage 16. For example the number of occupants can be output to a control system for controlling ambient control systems such as lighting, heating or air conditioning.

Figure 4:
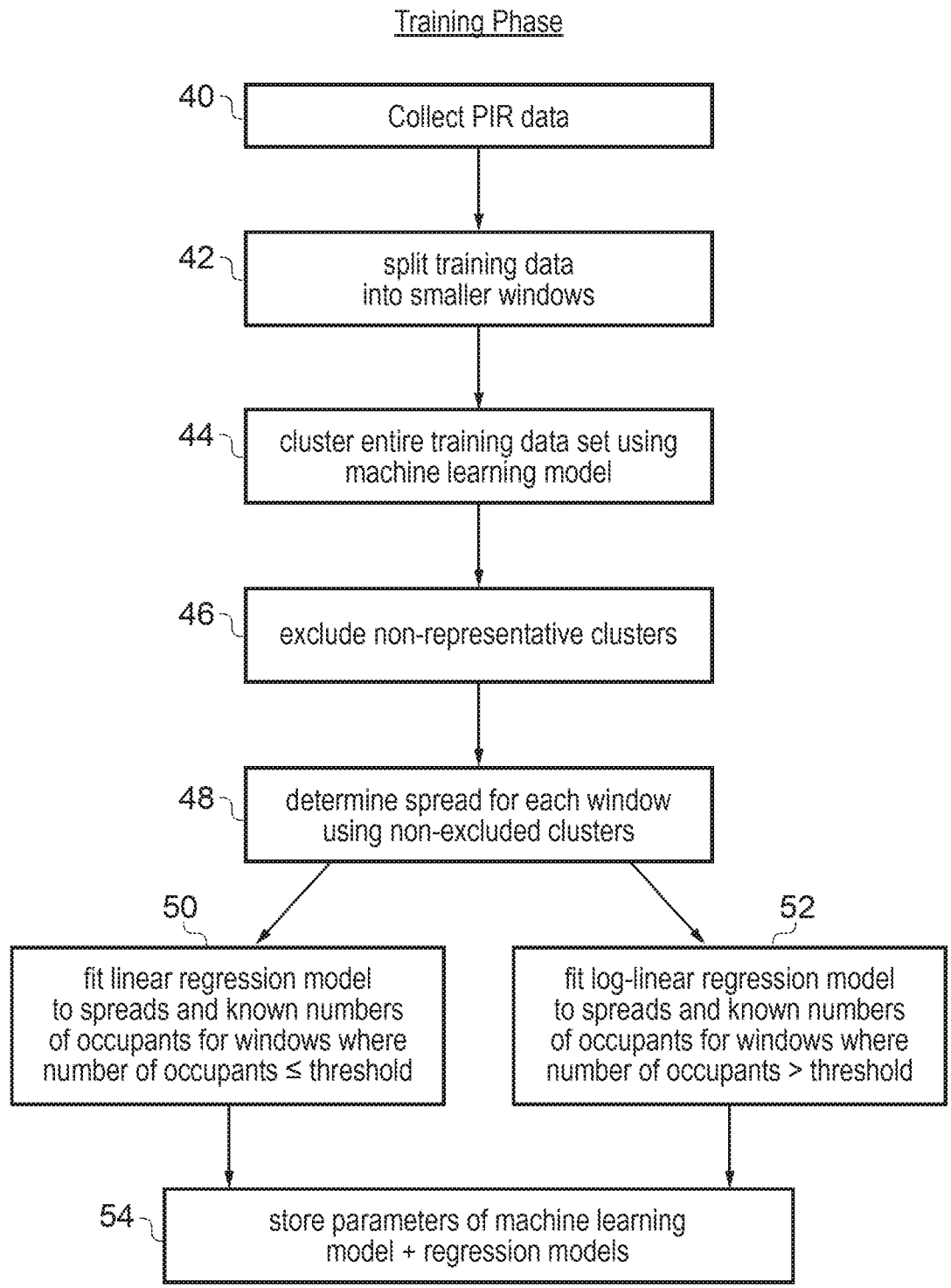
FIG. 4 is a flow diagram illustrating a method for training models for estimating the number of occupants in a region based on training data.

FIG. 4 shows a method of training the models 18 used to estimate the number of occupants. At step 40, PIR sensor data is collected across a range of meetings or other instances when different numbers of occupants gather in a region, and across a range of different environmental conditions, times of day, ambient lighting conditions etc. The greater the amount and variety of the training data, the better the predictive ability of the model and the robustness to different conditions. At step 42 the training data is split into a number of smaller windows. For example the partitioning could be according to each different meeting, or the data could be split into smaller chunks of time within the same meeting. Each window is associated with a known occupancy count (the number of individuals present is recorded in correlation with the observed sensor data for each window). At step 44 the entire training data set is clustered using a machine learning model such as iHMM. Hence the training data is segmented into smaller segments of time (with the particular segmentation applied being learned from the training data by machine learning) and each segment of time is assigned to a particular cluster with the segments allocated to the same cluster being segments which have similar properties (either in terms of the absolute values of the sensor data in those segments or in terms of the time variation properties with which the values vary with time). The particular way in which the data is clustered may be learned automatically by the model as it is updated in response to the training data.

At step 46 selected clusters of behaviour segments are excluded from the subsequent processing. For example, a machine learning model can be trained on collections of PIR data from both occupied and unoccupied regions. Clusters of motion which are detected in both regions describe more typical PIR data dynamics, where clusters of motion detected only in occupied regions are more likely to be specific to the monitored human behaviour. Larger or faster variations in motion detected by the PIR sensor are also unlikely to be correlated well to the number of occupants since they are more likely to be caused by a particular individual's movement. These clusters can be identified either by supervised input from a human operator during the training or can be identified automatically if including certain clusters in the calculation of the spread parameters is found to decrease prediction accuracy. Hence, there may be multiple iterations whereby predictions are made and then the clustering/filtering model is refined based on the predictions during the training phase.

Having excluded selected clusters, the remaining clusters are used at step 48 to determine the spread of the probability distribution for each window of training data. The training windows are then divided into two subsets based on the known numbers of occupants associated with each window. At step 50 the windows for which the number of occupants is less than or equal to a given threshold (e.g. seven or eight occupants) are used to fit a regression model which maps the spreads associated with those windows to the corresponding known numbers of occupants. Various fitting algorithms could be used, but a linear regression model has been found to be sufficient. At step 52 a log-linear regression model is fit to the spreads and numbers of occupants for windows where the numbers of occupants are greater than the threshold. At step 54 the parameters of the machine learning model for clustering and the two regression models are stored to the data storage 16 for use when the system is subsequently used in the field to predict the number of occupants in monitored regions.

Figure 5:
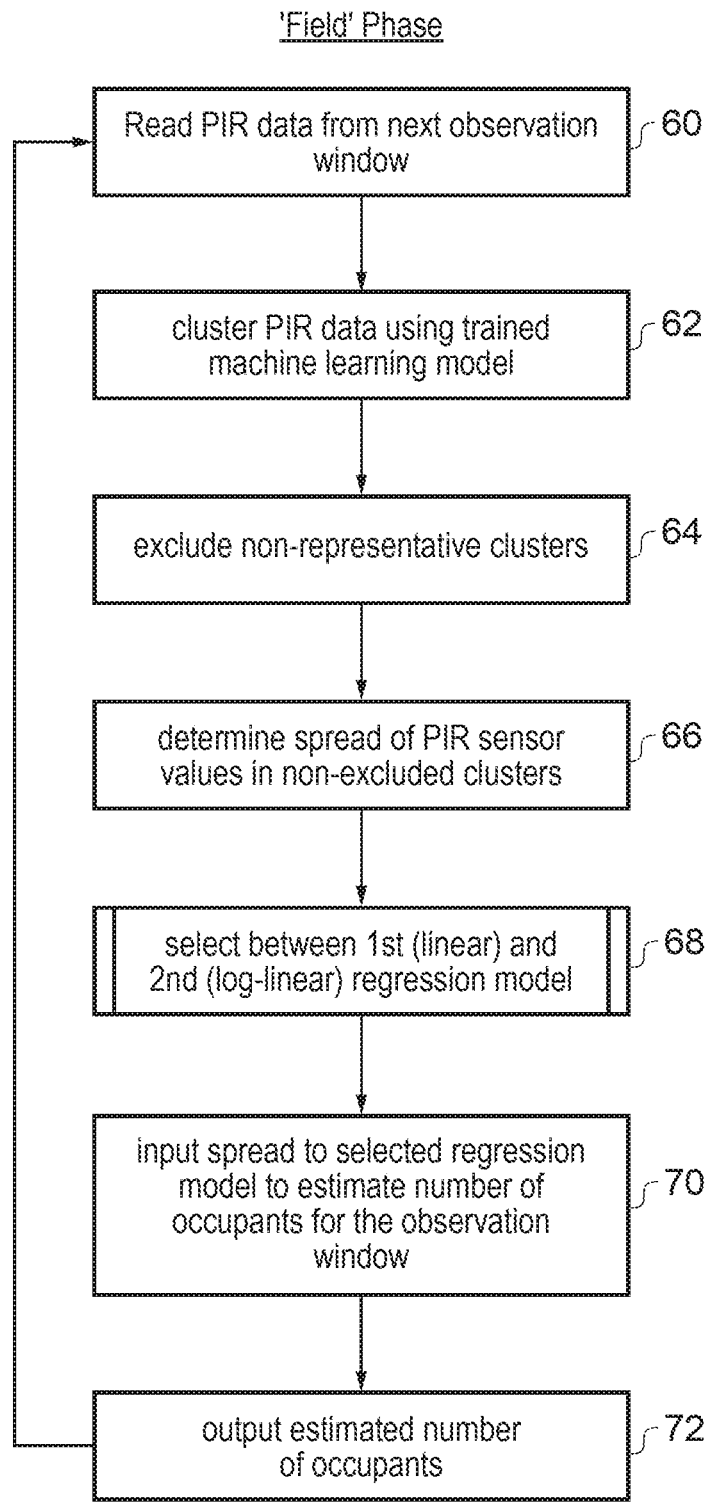
FIG. 5 is a flow diagram illustrating in more detail a method of using the trained models to determine the number of occupants.

FIG. 5 is a flow diagram showing a method of estimating a number of occupants when the system 10 is subsequently used "in the field", to provide an indication of the number of occupants in situations where the number of occupants is not already known. At step 60 the series of PIR sensor data for the next observation window is read from the data storage 16. At step 62 the processing circuitry 14 clusters the window of PIR data using the trained machine learning model 22. Even when clustering real PIR data in the field, the machine learning model may continue being adapted to the observed PIR data and so the particular way in which data is clustered may continue to vary over time. Having identified segments of data within the series of PIR data as belonging to particular clusters, at step 64 the PIR data identified as belonging to one or more non-representative clusters are excluded from the subsequent processing. As discussed above, these may be fast motion clusters identified during training as less representative of the occupancy count. At step 66, the microprocessor 14 determines the spread of PIR sensor values based on the non-excluded clusters only. At step 68 the microprocessor 14 selects which regression model to use. The microprocessor 14 selects between a first regression model (linear regression model) and second regression model (log-linear regression model) based on either the spread determined at step 66 or the number of occupants previously estimated for the region of interest in previous observation windows. Different methods for selection of the regression model are discussed in FIGS. 6 and 7 below. At step 70 the selected regression model is used to estimate the number of occupants for the current observation window. The spread is input to the model and the coefficients 20 defining the regression model are used to calculate the estimated number of occupants. At step 72 the estimated number of occupants is output and/or stored to the data storage 16 and can be used for a range of applications. The method of FIG. 5 then returns to step 60 to read the PIR data for the next observation window and the method continues.

Figure 6:
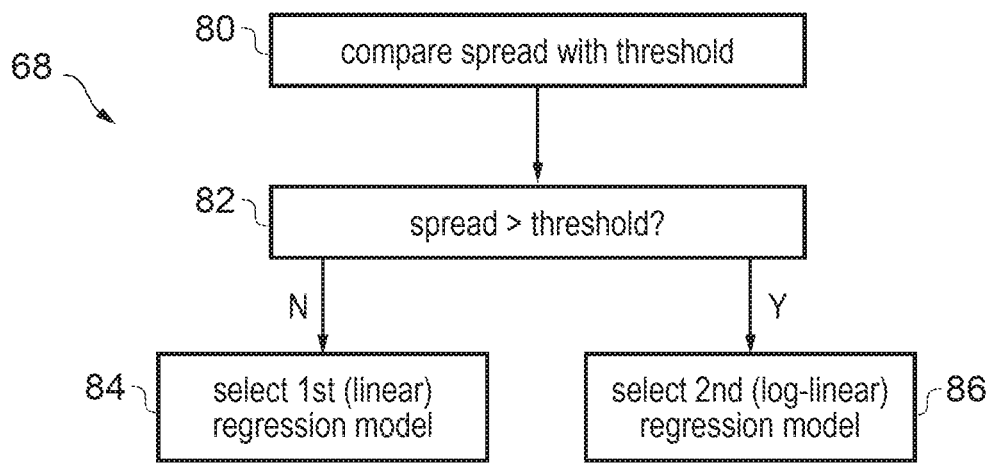
FIGS. 6 and 7 illustrate two alternative techniques for selecting between first and second regression models for estimating the number of occupants based on the spread of PIR sensor values.

FIG. 6 shows a first example of selecting the regression model at step 68. At step 80 the spread parameter detected at step 66 is compared with a predetermined threshold. For example for the Laplace spread, a threshold of approximately 0.09 has been found to work well, but more generally the particular threshold to use may be determined during the training phase. At step 82, it is determined whether the spread is greater than the threshold. If not then at step 84 the first regression model is selected while if the spread is greater than the threshold then at step 86 the second regression model is selected. While FIG. 6 shows an example where the first regression model is used when the spread equals the threshold, in other embodiments the second regression model could be selected in this case.

Figure 7:
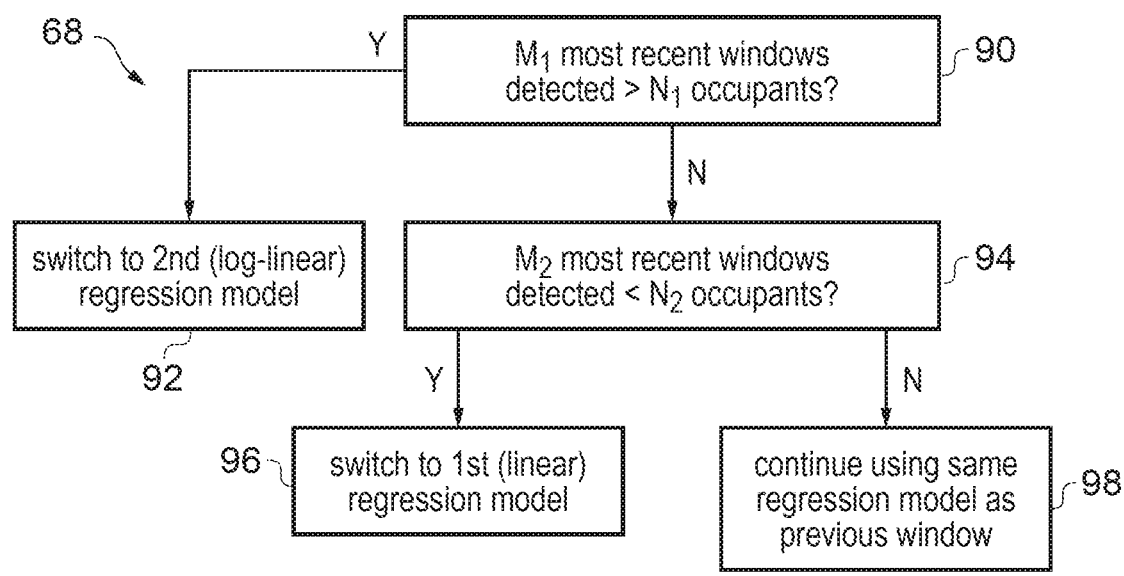

FIG. 7 shows an alternative technique for selecting the regression model at step 68. In this approach, successive windows of PIR data are processed based on a current one of the regression models (which can initially be selected randomly or default to a particular one of the models), and the current regression model is switched if there are more than a certain number of successive windows for which the number of occupants was detected to be greater or less than a given threshold. At step 90 the microprocessor detects whether a certain number $M_1$ of the most recently processed windows of time were detected as having more than a first threshold number $N_1$ of occupants. If so, then at step 92 the processor switches to using the second (log-linear) regression model for a subsequent window of time, if the processor was not already using the second model. On the other hand, at step 94 it is determined whether a certain number $M_2$ of most recently processed windows of PIR data were detected as having fewer than a second threshold number $N_2$ of occupants. If so then at step 96 the system switches to using the first (linear) regression model for subsequent windows (if the first model was not already being used). If neither of the conditions in steps 90 and 94 is met, then the system continues to use the current model at step 98.

Hence, a run of $M_1$ windows where the estimated number of occupants is higher than the threshold $N_1$ triggers switching to the log-linear model which is typically more accurate for higher numbers of occupants. On the other hand, a run of $M_2$ successive windows where the number of occupants is less than $N_2$ triggers switching to the linear model, which is typically more accurate for lower numbers of occupants. In some cases $M_1=M_2$ and $N_1=N_2$, and so switching may be symmetric. It is also possible to bias towards one or other model by varying the thresholds or number of consecutive runs required (e.g. if $M_1>M_2$ or $N_1>N_2$ then switching to the log-linear model may require greater certainty than switching back to the linear model).

Alternatively, a counter could be used to control switching between the first and second models:
- increment the counter if the number of occupants detected for the current window of PIR sensor data is greater than $N_1$
- decrement the counter if the number of occupants detected for the current window of PIR sensor data is less than $N_2$
- select the second model if the counter exceeds a given threshold M and the first model otherwise.

With this approach, an occasional window when the number of occupants does not meet the switching criterion does not prevent a run of previous windows, most of which meet the switching criterion, from triggering a switch. That is, it is not essential for the previous windows which meet the switching condition leading to a switch to be consecutive.

In summary, selection between the first and second regression models can be made either by a static method or a dynamic method:
a) Static method: Looking at the training data, we observe that most of the spread parameters from the meetings with a threshold number (e.g. 7) or fewer people are smaller than a certain threshold. This threshold can be used to make a decision which regression model to use when the spread parameter is calculated. However, this threshold is a static number determined by the training data, and will not change with the new observations.
b) Dynamic method: The decision on which regression model to use is made dynamically. An initial decision is made randomly between one of them. If the system predicts a number of occupants beyond the threshold number (e.g. 7) n times in a row, then the system will switch to the other regression model (switching to log-linear model when the number of occupants is above the threshold and to linear when the number of occupants is below).

In general, the estimation of the number of occupants based on the spread of PIR sensor data can be used for a wide range of applications. The technique can be used in any situation in which it is desired to provide an automated means of providing a quantitative estimate of the number of occupants present in a given region. Some particular examples are discussed below:
- a building control system may adjust an environmental control system (e.g. air conditioning, heating or lighting) based on the number of occupants in a given space.

a burglar alarm system or other security system could consider the estimated number of occupants when determining whether to raise an alarm or to signal that a human operator should investigate further. For example, while some limited human presence may be expected in a given space (e.g. the number of inhabitants is expected to be 3 or less, say), if the number of individuals is unusually high then this may trigger an alarm condition or the intervention of a human operator to check whether there is a problem.

In emergency response scenarios, an automated estimate of the number of people who are in a building at the time of the emergency could assist rescuer, for example, estimating the number of people within a building at the time of a fire.

Televisions or other media playing devices could adapt their content to the number of viewers detected in the surroundings of the device. This may be particularly useful for three-dimensional television using stereoscopic techniques, where the content or apparent positions of objects could be adapted to the particular number of viewers.

It will be appreciated that many further applications of the method of detecting occupancy numbers can be provided.

Further details and results from a research study of the technique are presented below. It will be appreciated that the invention is not limited to the particular set up used in the study.

Passive infrared sensors have widespread use in many applications, including motion detectors for alarms, lighting systems and hand dryers. Combinations of multiple PIR sensors have also been used to count the number of humans passing through doorways. Demonstrated here is use of a PIR sensor to estimate the number of people occupying a monitored environment. In embodiments, the approach shows the application of nonparametric machine learning algorithms to extract useful information about this problem from a simple PIR sensor. This approach allows us to understand the motion patterns generated by occupants within the monitored environment. The proposed counting system uses this information to provide an accurate estimate of room occupancy which can be updated every 30 seconds. The system was successfully tested on data from more than 50 real office meetings consisting of up to 14 room occupants.

The increasing focus on designing human living environments that are responsive to the people that inhabit them, raises the demand for energy efficient and cost effective sensing devices that are capable of counting the number of occupants in a room. Existing systems for estimating the number of occupants within a monitored room can be divided into two classes: mechanisms that use a set of sensors which cover the whole area of interest, and mechanisms that use simple sensors to count individuals passing through all entry and exit locations. Sensors that monitor the whole area of interest are typically visible light and thermal cameras which are expensive and suffer from low accuracy in crowded areas. Systems that track movements at entry and exit locations using simple motion sensors (e.g., passive infrared (PIR) sensors, break-beams, mechanical barriers, etc.) can be inaccurate due to their inability to correctly identify the number of individuals passing through these locations when that number becomes large. In addition, such systems require multiple sensors and often require specific physical siting in the environment which usually entails costly specialist installation. These shortcomings raise the demand for systems that can provide an accurate human occupancy count in a closed environment, while being simple enough to install by a non-expert, and that rely on low-cost data sensing devices with low computational power. Simple, low-cost PIR sensors can be readily obtained for less than $10 at time of press. PIR sensors are already employed in commercial buildings for various tasks related to human motion detection such as controlling light switches and triggering burglar alarms. Systems using distributed networks of PIR sensors placed in hallways and gateways of closed facilities to count the number of people entering or exiting are well-studied.

By contrast to previous systems, we investigate the potential of using a single low-cost PIR sensor for counting the number of people in the whole area of interest and propose a novel system based on a single sensor inside the monitored room. We extract motion patterns from the raw sensor data with an infinite hidden Markov model (iHMM) and use those patterns to infer the number of occupants using statistical regression methods. This system is well-suited to the adaptive setting on active deployment whereby the iHMM readily finds new motion patterns in the signal as new data arrives.

We demonstrate the system configured to estimate an occupancy count on various time windows ranging from 30 seconds to 20 minutes (by way of example). The result of these tests show that this approach can accurately estimate room occupancy count to within ±1 for time windows of less than 2 minutes. We also explore the limitations of a single PIR sensor in terms of the monitored room size, maximum number of distinguishable occupants, and the restrictions imposed by the sensor's range and view angle.

Challenges of Occupancy Counting with Single PIR Sensor

An aim of this research is to obtain an accurate estimate of the number of occupants in an office meeting within a closed room using data from a single PIR sensor sited at an arbitrary location within the room, where the data is collected over a short time window. The simplicity of the sensor will create some specific challenges that should be carefully considered when modeling the data. A PIR sensor outputs the change in temperature of a passing body compared to the background temperature of the field of view, therefore we have verified the importance of the particular room in which each experiment is performed. Since most infrared radiation is reflected from the human body, occupants within the monitored environment can be easily blocked from the field of view of a single sensor by other occupants. In addition, because the digital output of the sensor saturates at a maximum value, there is a limited range motion that we can actually differentiate with this type of sensor. For example, if two or more people are sufficiently active and close to the sensor to generate more than the maximum range of motion, the sensor would be unable to detect the motion patterns of the rest of the occupants. That is, the occupants occlude each other not only by physically constraining the field of view of the sensor, but also by exceeding the maximum range of motion that the PIR can measure.

We observe that more occupants would on average generate increasing range of motion if we observe them over increasingly long periods of time. Therefore, a simplistic approach to occupancy count is to assume that increasing range of motion corresponds to increasing occupancy count. However, within short observation time windows (e.g. 30 seconds or less) it is likely that the temporally local behaviour of particular individuals will undermine this assumption. By taking into account such temporally local behaviours to extract properties of the global behaviour, in particular whether a participant is in the room or not, accuracy can be improved.

System Overview

We describe the following stages in our proposed solution to the training phase for occupancy estimation:
1. Collect data: The data acquisition process and the statistical nature of the recorded PIR output is discussed in detail in the Experimental setup section.
2. Split training data into smaller windows: We split the training data into different time windows of PIR output to examine the duration of signal sufficient to accurately estimate number of monitored people.
3. Cluster the entire training dataset using iHMM: Once data has been partitioned to smaller time windows, all of the training data is clustered using iHMM in order to extract physical behaviour of interest from the raw PIR signal.
4. Filter data from fast motion clusters: The behaviour that biases the occupancy estimation is filtered.
5. Estimate Laplace spread parameters for each window: we model the remaining data using Laplace distribution. The estimated Laplace parameters describe well how populated a meeting has been and can be efficiently used in a regression model.
6a. Fit a linear regression model (spreads and number of occupants).
6b. Fit a log-linear regression model (spreads and number of occupants).
Different regression models are used for more and less occupied meetings to increase estimation accuracy.

During the "field phase", data is collected for a single observation window, and then steps 3-6 are performed, with one of steps 6a and 6b selected based on one of the selection techniques discussed above with respect to FIGS. 6 and 7.

Experimental Setup

Collection Devices

In this study we attached two PIR motion sensors (Panasonic AMN21111 and AMN22112) with different sensitivities and viewing angles to a prototyping board connected to an ARM mbed NUCLEO F401-RE microcontroller board. The board is powered at 5V through the microcontroller, and the microcontroller is powered through a USB cable that connects it to a laptop. The two PIR sensors are placed next to each other on the same board. One sensor is a standard type PIR, 14.5 mm tall, lens surface area 9.5 mm and 9.8 mm mounting hole. It has 5 m detection range, horizontal view of 82° and top (vertical) view of 100° and records approximately 30 single dimensional digital measurements per second. The second sensor is a small motion detection type PIR with the same data sampling rate, but reduced detection range of 2 m, and both horizontal and vertical view of 92°. The board is placed in the middle of the room, adjacent to the wider wall in rectangular rooms, with the sensors facing the room interior. The height at which the sensors are positioned varies (between 0.70 m and 1.00 m). Both sensors are used to simultaneously record motion data and transmit it to a laptop. Experimentation determined that results were better for the standard type PIR sensor (due to the larger viewing angle than the small motion PIR sensor) and so the standard type PIR sensor was used for subsequent experiments.

Data Collection

The microcontroller board and PIR sensors were deployed in several conference rooms in an office building, where the rooms vary in dimensions, access to sunlight and maximum occupant capacity. In addition the sensor location, the number of individuals in the room, the nature of the meetings and the time of day at which meetings took place, was varied. Before the start of an actual company meeting, the board was placed in the middle of the room so that most of the seating area fell within the viewing angle of PIR sensor. Upon the start of the meeting sensor data was recorded. The first and the last five minutes of the recorded PIR sensor data are removed to account for the system installation and the time window for occupants to settle in. For the duration of the meeting, the observed count of occupants is recorded, which forms the ground truth occupancy count.

Sensor Data Description

Figure 8:
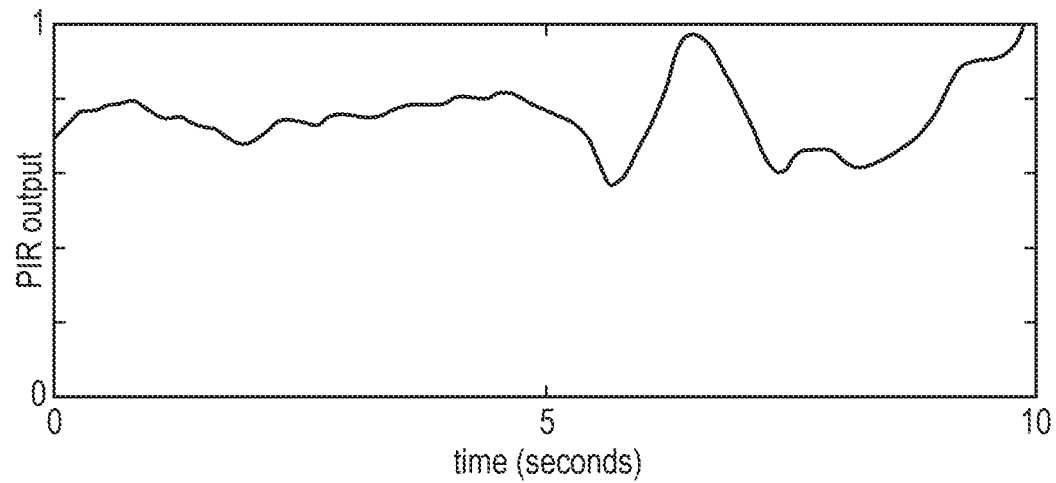
FIG. 8 shows an example of raw PIR sensor data recorded using a digital PIR sensor over a period of ten seconds.

The recorded raw digital PIR signal comprises a stream of real numbers in the range 0 to 1 with 4 decimal place accuracy. The temporal fluctuations in this signal reflect certain movements in the monitored environment (see FIG. 8, which shows an example of raw digital data recorded using the standard digital PIR sensor for a period of 10 seconds). The challenge we are addressing entails analyzing these fluctuations to infer the number of people occupying the monitored room. The PIR output for a typical 1 hour meeting comprises a set of approximately 120,000 real numbers.

Figure 9:
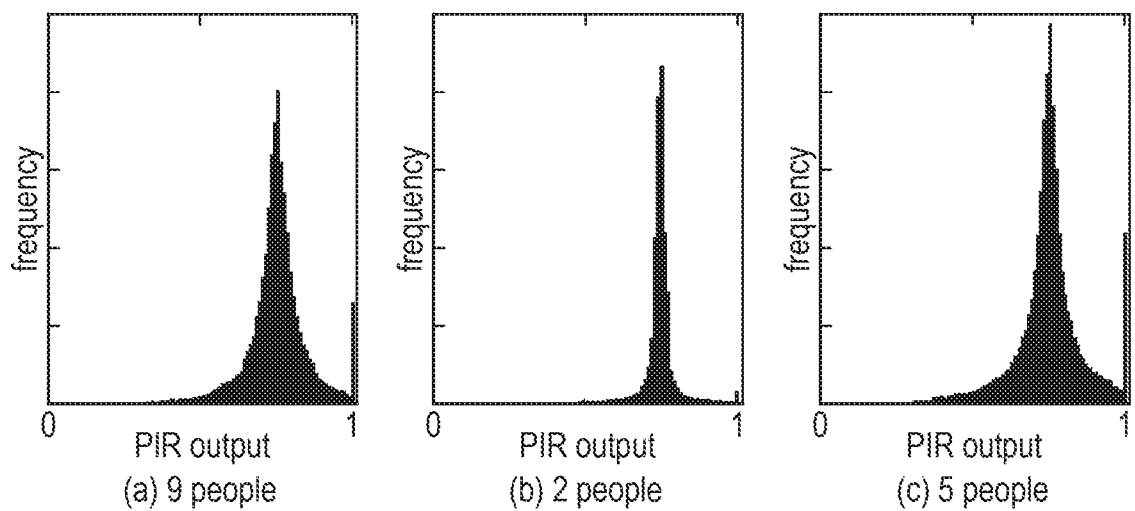
FIG. 9 illustrates three histograms indicating the distribution of raw PIR sensor data from three different meetings with varying numbers of occupants over a duration of approximately one hour.

FIG. 9 shows a histogram of raw PIR data from three different meetings with varying number of occupants and approximately 1 hour duration. FIG. 9 depicts the statistical distribution of the sensor data from different meetings, which ignores the time ordering of the data. The sharp peak in the distribution at the median value, combined with the fat tails and the truncation at the maximum sensor value 1 suggest that for longer durations the PIR data is well described by a mixture of a truncated Laplace distribution centred at the median value, and a Dirac delta distribution centred at 1. The truncation and the spike at 1 are explained by the shadowing effect of the PIR sensor: when the movement in the room exceeds a certain threshold, the sensor saturates at 1 which obscures any other motion in the room.

Laplace Modelling

Figure 10:
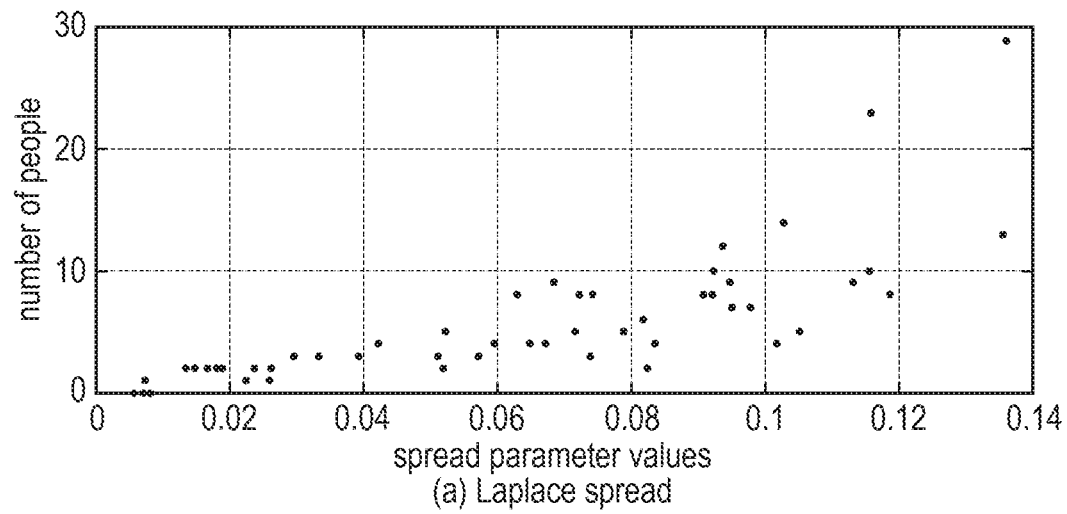
FIG. 10 illustrates the spread and location parameters of a Laplace distribution fitted to the PIR sensor values detected during different meetings, plotted against the number of occupants in each meeting.
Figure 10:
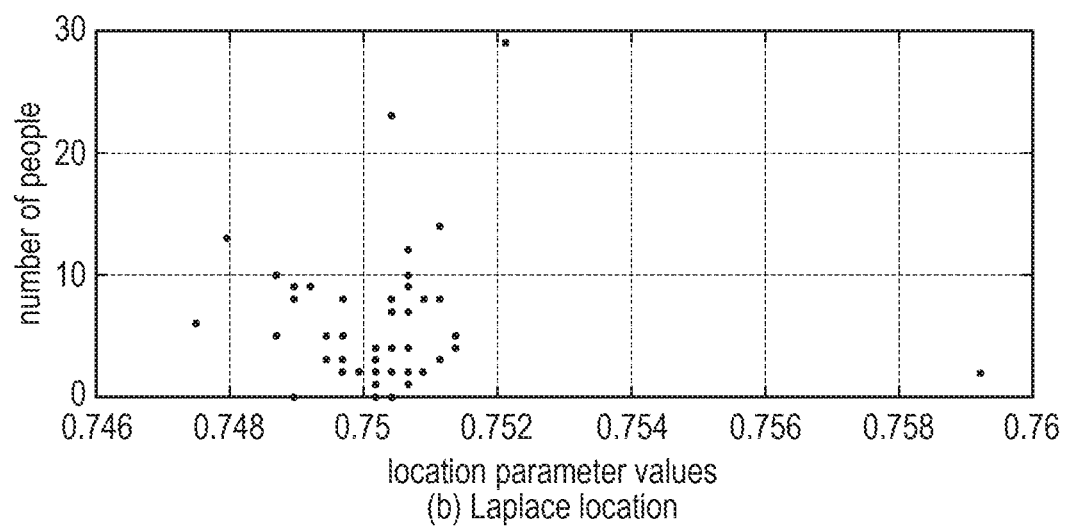

We showed that the digital PIR data for different meetings is well described with a two component mixture of a truncated Laplace distribution and a Dirac delta spike centred at 1. Ignoring the spike for computational tractability, it is then reasonable to model the data from different meetings with different Laplace distributions, $x_j \sim \mathcal{L}(\mu_j, b_j)$, where $x_j$ denotes the sensor data stream of PIR measurements from meeting j collated into a single vector, and $(\mu_j, b_j)$ are respectively the location and spread parameter of the Laplace distribution. We estimate $\mu_1 \ldots \mu_j$ and $b_1 \ldots b_j$ using:

$$\mu_j = \text{median}(x_j), \quad b_j = \frac{1}{N_j} \sum_{i: x \in x_j} |x_i - \mu_j|$$

where J denotes the number of training meetings (in this study J=53) and $N_j$ denotes the number of PIR output points for meeting j. In FIG. 10 we plot each $\mu_j$ and $b_j$ against the number of people that have been present at meeting j. While the location parameters do not vary substantially across meetings, we observe that meetings with higher occupancy are more likely to have larger spread. In addition, we notice that the relationship between the count and the spread parameter changes quite substantially for meetings with more than about 8 occupants. Therefore, a simple linearly increasing relationship between spread and occupancy count might be inaccurate for meetings with larger numbers of occupants. One approach to addressing this situation is to stratify the problem into low (less than 8) and high (greater than or equal to 8) occupancy count problems, with different models for each. Examination of the monitored rooms shows that assuming normal seating patterns 8 occupants are the most that can fit within the field of view of the standard PIR type sensor without occupants occluding each other. With a PIR sensor with wider field of view, the limit may be higher and so a different threshold could be used to divide into low/high occupancy count models.

The specific character of the discrete-valued occupancy count makes generalized linear model (GLMs) regression an appropriate first choice for modeling the dependence between the Laplace spread parameter and the occupancy count. We will treat low occupancy meetings with fewer than 8 occupants separately from the ones with 8 or more occupants (or stratify at b~0.09). Multiple types of GLM regressions were compared in terms of mean absolute error; the best fit for meetings with up to 7 occupants is obtained with a linear model with Gaussian outputs; for the second strata of high occupancy meetings a log-linear model with Poisson outputs as for high occupancy meetings the number of occupants increases exponentially with the spread parameter.

Regression Component

The mean absolute error for the low occupancy strata (less than 8 individuals) is less than ±1. This suggests that with Laplace parameters estimated from the PIR data from an observed meeting, we can identify the number of occupants to within ±1 individual. For the high occupancy strata the count prediction accuracy is reduced, but some relationship can be captured with mean absolute error of the log-linear model less than ±1.25 individuals.

While there exist alternate regression models which could be used (e.g. support vector regression, kernel regression, Gaussian process regression or convolutional neural networks), some require increased amounts of memory, computational power and training data. Furthermore, with such complex models, the model is hard to interpret. Specifically, these models often have large numbers of parameters and it can be difficult to predict from an analysis of the trained model what the effect on the occupancy count prediction will be when varying any one of these parameters. For example, support vector regression requires that all support vectors are held in memory, and requires quadratic programming to train the regression model. Similarly, while convolutional neural networks have been used to solve difficult regression problems to high prediction accuracy, these require vast amounts of training data and have computational demands which mean they are generally out of reach of low power embedded microcontroller systems.

By comparison, GLMs, because they lead to convex optimization problems in parameter training, can be trained using simple gradient descent algorithms.

Time Window Duration

Figure 11:
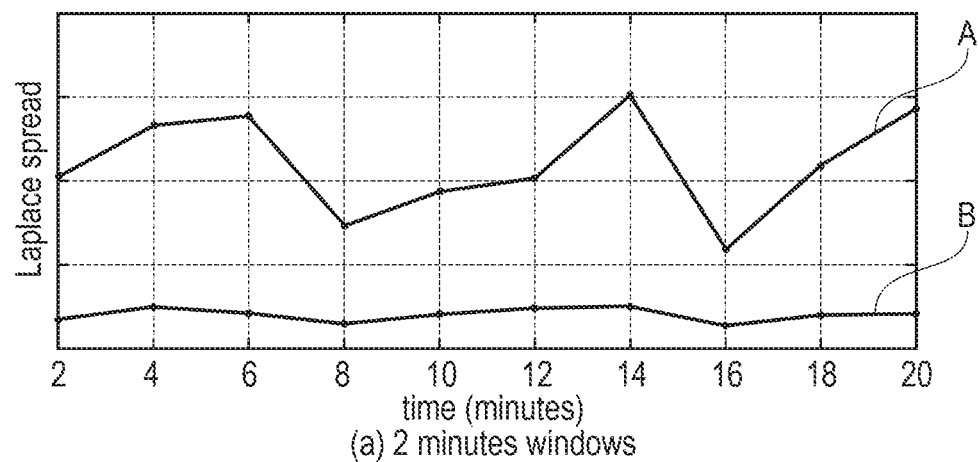
FIG. 11 illustrates the variation over time of the Laplace spread parameters detected for successive windows of time of different durations, and shows a comparison between detecting the Laplace parameters based on the raw PIR sensor data and detecting the Laplace parameters based on sensor data filtered using a machine learning model.
Figure 11:
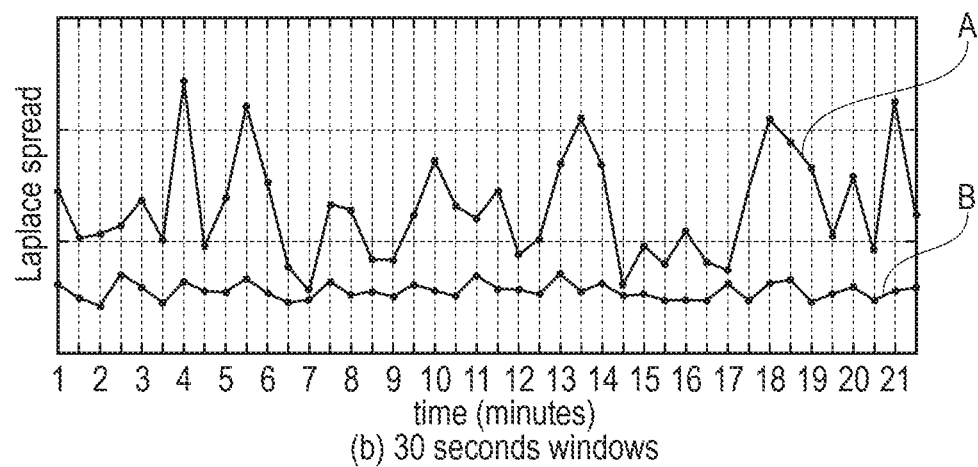

The Laplace spread parameters for each meeting were estimated from all of the PIR data for that meeting, most often approximately an hour. Therefore, to make a prediction for the occupancy count, we have to wait the whole duration of the meeting. To be practical, the system needs to be able to work for much shorter time windows. We next investigate this by fitting a Laplace distribution to shorter time segments of the raw sensor data. Instead of estimating parameters from the data for the whole meeting, we estimate the same Laplace parameters for every 2 minutes time windows, that is we partition each meeting in multiple smaller, non-overlapping time windows. The problem we will face is that shorter time segments of PIR data are more conflated with short-term individual behaviour which is not representative of the current number of occupants. FIG. 11 shows the Laplace spread parameters for different time windows of a meeting with 9 occupants. Line A shows the spread parameter estimated from all the raw PIR sensor data, whereas Line B shows the spread parameter estimated from only points in the selected small motion behaviour as discussed below.

Hence, FIG. 11 shows estimates of the spread parameters evaluated every consecutive 2 minutes or 30 seconds of a meeting with 9 occupants present for the entire duration. Ideally, the Laplace parameters would be almost constant across all time windows, indicating that data recorded from the same meeting is summarized with the same parameter values. The varying spread of the raw data from the same meeting is explained by the varying movements of the occupants during the meeting. This variation will be due to temporally local and/or individual behaviours which depend upon the precise nature of the meeting and the habits of the occupants, the effect of which diminishes over longer time windows.

We address this problem of the Laplace parameters varying during the meeting by clustering the training data into groups of similar motion patterns and then matching the motion structure discovered onto patterns of human behaviour we expect to observe. To have a sufficiently flexible grouping of behaviour, and to allow the number of behaviours to grow as more data becomes available, we model these groupings using the infinite hidden Markov model (iHMM) [further details of which can be found in Beal et al, "The infinite hidden markov model", *Advances in Neural Information Processing Systems*, pages 577-584, 2001]. In this way, instead of using all the PIR data we focus the analysis only on the clusters that are most universally likely to describe the occupancy count. This approach substantially reduces the variation in spread parameters over the duration of the meeting, for shorter time windows (see line B in FIG. 11).

Extracting Behaviour from PIR Data

The Infinite Hidden Markov Model (iHMM)

Figure 12:
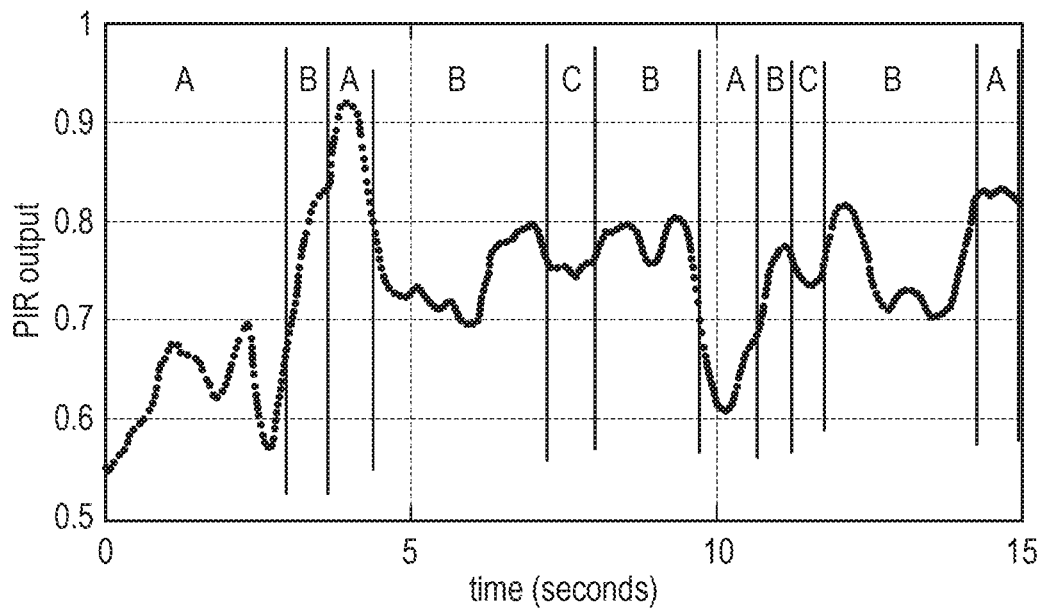
FIG. 12 schematically illustrates an example of clustering segments of PIR sensor data based on a machine learning model such as the infinite hidden Markov model.

The hidden Markov model (HMM) is a widely used probabilistic model for segmentation of time series data and has been successfully used to model behavioural patterns of sequential data from different sources. Typically, some K number of different temporal patterns is assumed a priori and we learn a clustering of the data into K groups incorporating some measure of similarity between points and the time dynamics of the data. The nature of the clustering is highly dependent on the choice of K. The time dynamics of the data is modelled by the Markov assumption for the discrete hidden states, one state per cluster, the HMM assumes the observed data is independent given the hidden states. However, a constraint of the HMM is that we do not know K in advance and further we should assume that K will change as the nature of the meetings, the occupants and the occupancy count changes. That is, we will assume that the number of behavioural patterns will approach infinity as the data grows to infinity, but will be some finite unknown $K^+$ for any finite subset of the data. These are the modeling assumptions of the iHMM. The iHMM adapts its complexity to the structure in the data making it a good choice for the segmentation of streaming data. FIG. 12 shows an example of the clustering output of the iHMM applied to 15 seconds PIR data. The iHMM divides the series of PIR data into segments, and each segment is classified into a particular cluster (in this example three different clusters A, B, C are shown, but the number of the clusters has not been specified a priori, but learned from the data). The iHMM has been trained on all of the training data which exceeds 53 hours rather than just on the 15 seconds that are displayed.

Assuming T is the number of PIR recordings from all meetings, let us denote the raw sensor data with $x_1 \ldots x_T$. Every observed recording $t \in \{1, \ldots, T\}$ is associated with a hidden variable $z_t$ indicating the cluster (state) of that observation and every state $k \in \{1, \ldots, K^+\}$ is modeled with a Laplace distribution $\mathcal{L}(\mu, b_k)$ with fixed location parameter $\mu$ and cluster specific spread $b_k$. Conveniently, the Laplace distribution with fixed location has a conjugate prior. Further we observed similar location parameter values across different meetings. Transitions between states are governed by Markov dynamics parameterized by the transition matrix $\pi$, where $\pi_{ij} = p(z_t = k | z_{t-1} = i)$ for $t > 1$ and the vector $\pi_0$ denotes the initial state probabilities for $t=1$. Given the model parameters, the joint distribution over hidden states and the observations can be written as:

$$p(z,x|\pi,b) = \Pi_{t=1}^T p(z_t|z_{t-1})px_t|z_t) \quad (1)$$

To complete the Bayesian description of the iHMM we need to specify the priors over the random variables in the model. The conjugate choice for prior over the spread parameters $b_k$ is the inverse-gamma distribution, $b_k \sim \text{InvGamma}(\nu_0, \chi_0)$ and to obtain flexible non-fixed transition matrix we place a hierarchical Dirichlet process (HDP) prior over $\pi$, (HDP($\alpha, \gamma, G_0$)) [see Teh et al, "Hierarchical Dirichlet processes", *Journal of the American Statistical Association*, 101(476), 2006 for more detail concerning the HDP]. The hierarchical Dirichlet process (HDP) is set of coupled Dirichlet processes that can capture the more complex structure of an HMM transition matrix. The full Bayesian construction of the iHMM is often referred to as the HDP-HMM.

The Dirichlet process is a stochastic process most commonly used to construct infinite mixture models. It is parameterized by a positive concentration parameter $\alpha > 0$ and by its expectation $G_0$ which is a function. While in finite mixture models, we typically assume that the observed data groups into some finite K number of clusters, in infinite mixture models we assume that as more data is observed from the same population more clusters arise. In infinite mixture models, we learn the number of clusters $K^+$ from the data and instead we parametrize the strength of belief in the prior structure through $\alpha$.

In a similar way that Dirichlet processes can be used to infer the number of clusters in non time-ordered data the HDP allows us to infer the number of states in time series clustering. It is parameterized by a global concentration parameter $\gamma$ that controls the rate at which new clusters are generated on observing more data. For a given amount of observed data, a large $\gamma$ value leads to more clusters than a small value of $\gamma$. The local concentration parameter $\alpha$ controls how likely we are to observe repeating sequences of existing clusters. The expectation function $G_0$ is the prior distribution for the cluster parameters b. The transition matrix $\pi$ is modelled with an HDP characterized by the transition probability:

$$p(z_t = k | z_{t-1} = i) \propto \begin{cases} N_{k,i}^{-t} + \dfrac{\alpha M_k^{-t}}{\sum_k M_k + \gamma} & \text{for an existing state } k \\ \dfrac{\alpha \gamma}{\sum_k M_k + \gamma} & \text{for a new state} \end{cases} \quad (2)$$

where $N_{k,i}^{-t}$ counts the number of transitions between state i and state k have previously occurred, excluding observation t, and $M_k$ counts how many times state k has been chosen with a new transition.

Matching Motion Patterns to Behaviour

By fitting an infinite HMM to the raw PIR data, we aim to cluster together segments of the time series that are similar. In this way, observations that are grouped into the same cluster are more likely to describe the same physical pattern of movement. Note that typical human behaviours (e.g. walking, sitting down, standing up) are complex and so are composed of many different types of motion. Without making restrictive assumptions about the movement described by the recorded PIR signal, we are more likely to cluster together similar types of motion rather than composite human behaviours. At the same time obtaining the structure of the observed motion patterns is key to understanding how the different human behaviours are formed and in what way those behaviours differ based on the sequence of movements that form them. For our problem of occupancy counting, mapping sequences of motion patterns into composite behaviours is not the focus of the problem. However, HMMs have already proven useful for the more difficult problem of tracking the activity of monitored individuals in different problem domains.

We describe the collection of motion patterns that describe small movements as 'small motion behaviour'. In order to separate parts of the PIR output describing this small motion behaviour, to filter out more larger movements, we examine the PIR recordings from an empty room. More precisely, we examine which clusters occur for empty rooms once the iHMM is fitted to whole of the data. Then we identify segments of the PIR signal, from occupied rooms, that are grouped together under clusters found in non-occupied rooms. The iHMM groups together motions that are temporally similar, so larger movements would be clustered in separate groups and we can easily filter them out. Large temporally local fluctuations in the PIR output reflect some temporally local human behaviour and will bias the occupancy count estimate (unless more information is available about the nature of these behaviours). In FIG. 12 clusters B and C are motions describing the 'small motion behaviour' and the data belonging to cluster A is filtered out. By focusing only on specific clusters, we are comparing Laplace parameters estimated from comparable (similar) sequences of PIR data which will make our estimates of those parameters less variable and more robust to reducing the occupancy count estimate time window (c.f. FIG. 11). In the collected training data approximately 70% of all of the training data groups into small motion behaviour and the on average 30% of the PIR output is filtered out.

System Evaluation

In this study we recorded PIR sensor data from 53 real-life meetings, 37 of those had up to 7 participants, the remaining 16 had more than 7, and the 2 most occupied meetings had 23 and 29 occupants, all with different meeting durations. The two most occupied meetings are excluded from the analysis as for the size of the monitored rooms and the viewing angle of the PIR sensor, data recorded from such over-populated meeting rooms is not meaningful. Indeed, the maximum seating space in the biggest of the monitored rooms is 14 people and typically exceeding this capacity leads to severely limiting the field of view of the PIR sensor which causes severe sensor occlusion and irretrievably biased sensor output.

We recorded only the single PIR sensor output from inside each meeting and the true number of occupants for each meeting, as a result the study is highly non-invasive. The data from each meeting is then split in smaller observation windows in order to track how the accuracy of the occupancy count system changes with the count estimation time window. Note that if we wish to receive an estimate of the current room occupancy every 30 seconds, naturally the accuracy of that estimate would be lower than an estimate obtained every 2 minutes or every 20 minutes. For numerous applications an occupancy count estimation updated only every 20 minutes would not be of great value so there is an inherent trade-off between accuracy and count estimate time window. We investigated time windows of 20 minutes, 2 minutes, 1 minute and 30 seconds. Additional investigation showed that processing windows longer than 20 minutes does not appear to provide a substantial increase in occupancy count estimation. As discussed earlier, we treat low and high occupancy count meetings differently in the analysis due to the different statistical nature of the data in these different occupancy strata.

Table 1 shows the percentage of time windows across all meetings (with less than 8 people) where the predicted number of occupants is within ±1 of the true number of occupants. In the square brackets is the percentage of time windows where the predicted number of occupants is within ±2 of the true number of occupants.

TABLE 1

| Window duration | Raw data | Small motion behaviour |
|---|---|---|
| 30 seconds | 63% [93%] | 80% [96%] |
| 1 minute | 80% [93%] | 83% [97%] |
| 2 minutes | 82% [96%] | 85% [99%] |
| 20 minutes | 89% [97%] | 92% [97%] |

Table 2 shows the percentage of time windows across all meetings (with at least 8 people) where the predicted number of occupants is within ±1 of the true number of occupants. In the square brackets is the percentage of time windows where the predicted number of occupants is within ±2 of the true number of occupants.

TABLE 2

| Window duration | Raw data | Small motion behaviour |
|---|---|---|
| 5 minutes | 68% [79%] | 59% [86%] |
| 20 minutes | 79% [84%] | 71% [84%] |

Fewer than 8 Occupants

Figure 13:
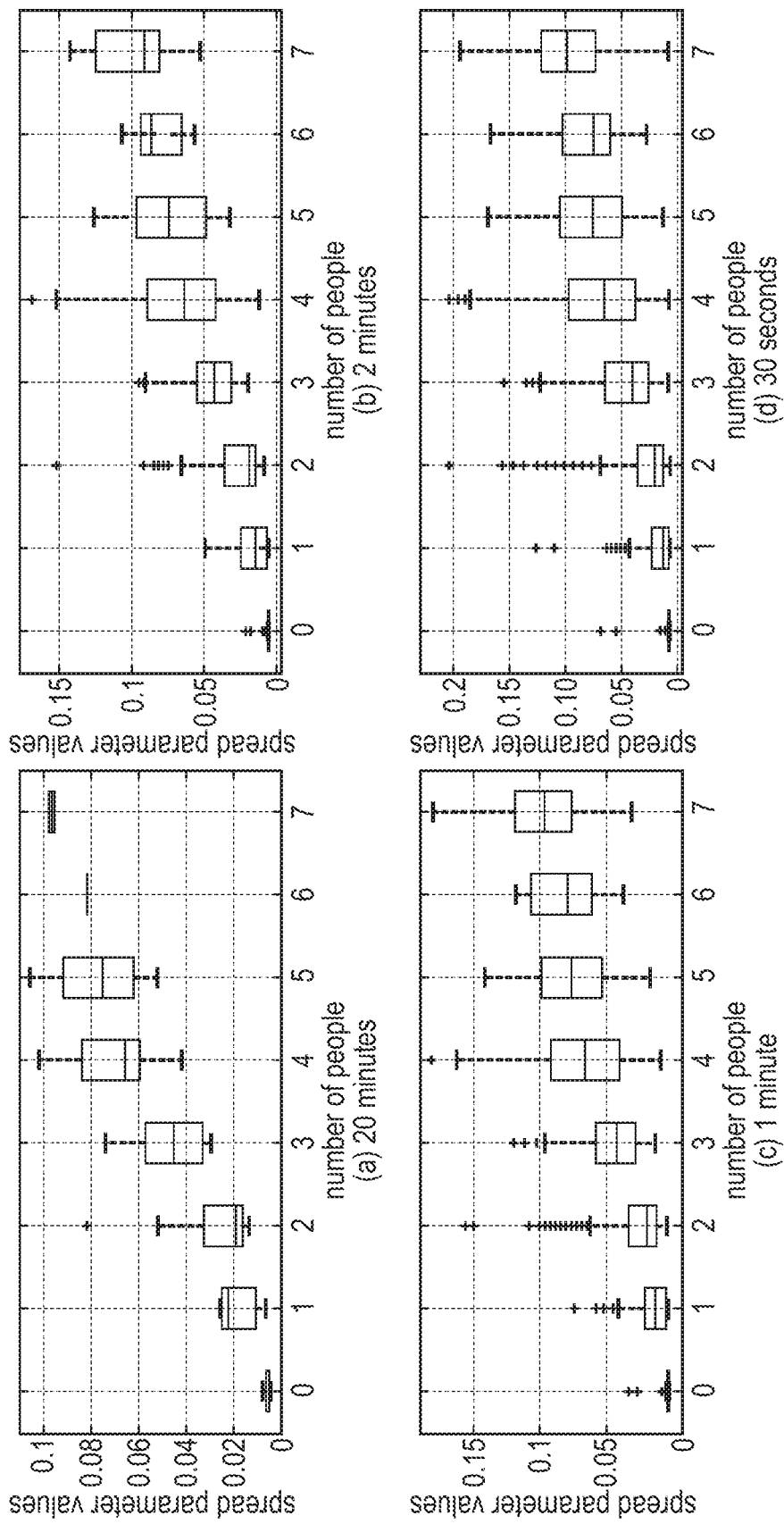
FIG. 13 illustrates box plots of Laplace spread parameter values estimated from raw PIR sensor data for different meetings with up to seven occupants over different estimation time window durations.

FIG. 13 shows box plots of Laplace spread parameters estimated from raw PIR data for different meetings with up to 7 occupants, over different estimation time window durations. Top and bottom edges of each box are 25th and 75th percentiles respectively, the middle red line inside the box is the median, and pluses denote outliers. In the case of a small number of occupants, a linear Gaussian regression model performed best in terms of mean absolute prediction error (MAE) and is used to predict the human occupancy count from the spread parameter alone. For shorter estimation time windows, the relationship between occupancy count and PIR data spread becomes unclear, the effect of which is clear from the numerical prediction accuracy estimates for predictions within ±1 and ±2 (Table 1) of the true occupancy count.

Figure 14:
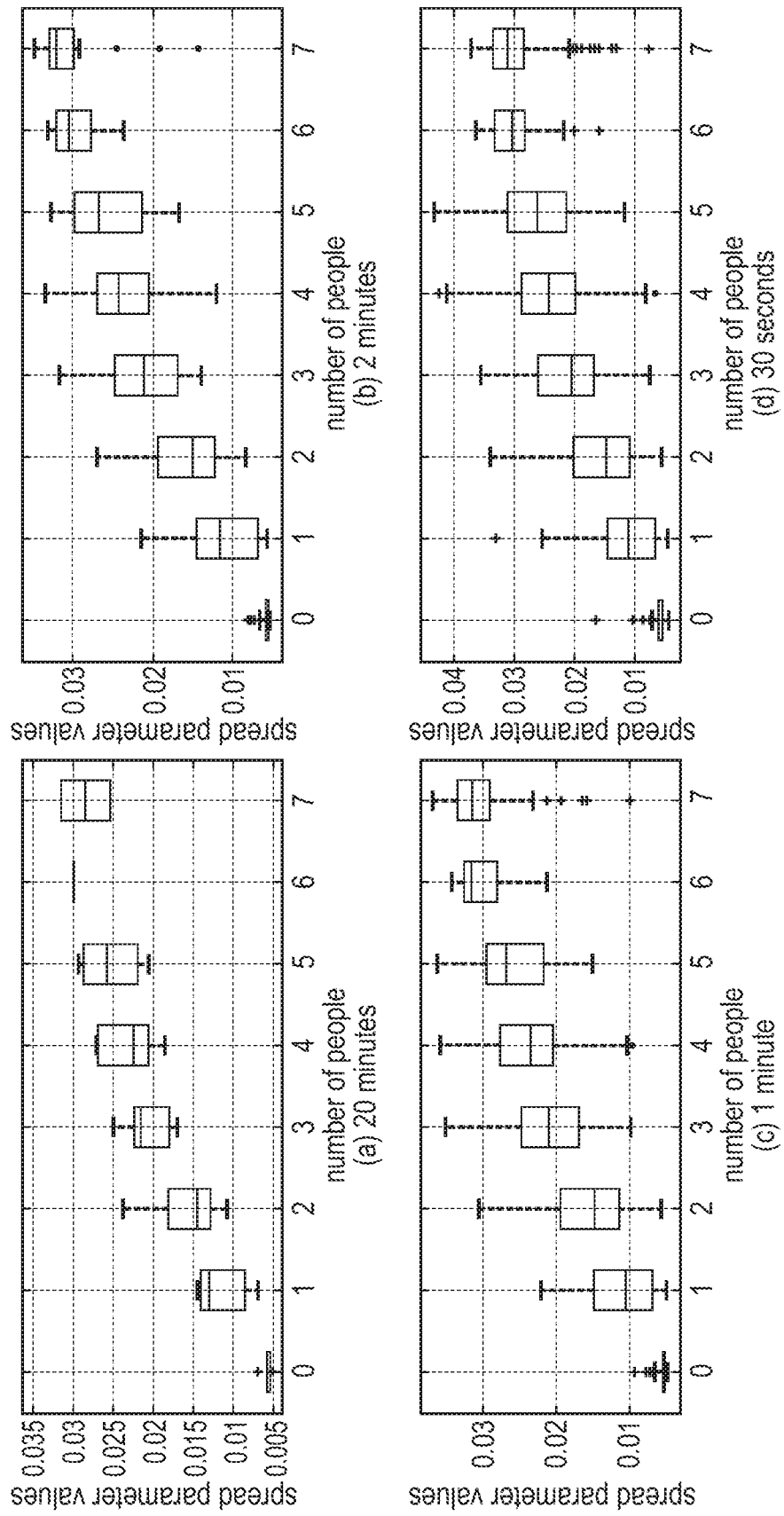
FIG. 14 illustrates box plots of stabilised spread parameters estimated from non-excluded clusters across meetings with up to seven occupants.

After the raw data is clustered with the Laplace iHMM and the clusters describing the saddle behaviour are separated, we estimate spread parameters only from the data representing these behaviours. Following the same recipe, Gaussian linear regression is used to predict occupancy count from the "stabilized" Laplace spreads for different count estimation time windows. FIG. 14 shows box plots of the "stabilized" spread parameters estimated only from the saddle behaviour clusters across all meetings with at most 7 occupants. As can be seen from FIG. 14 and the second column of Table 1, the resulting overall increase in prediction accuracy confirms the positive effect of iHMM behaviour clustering.

At Least 8 Occupants

Figure 15:
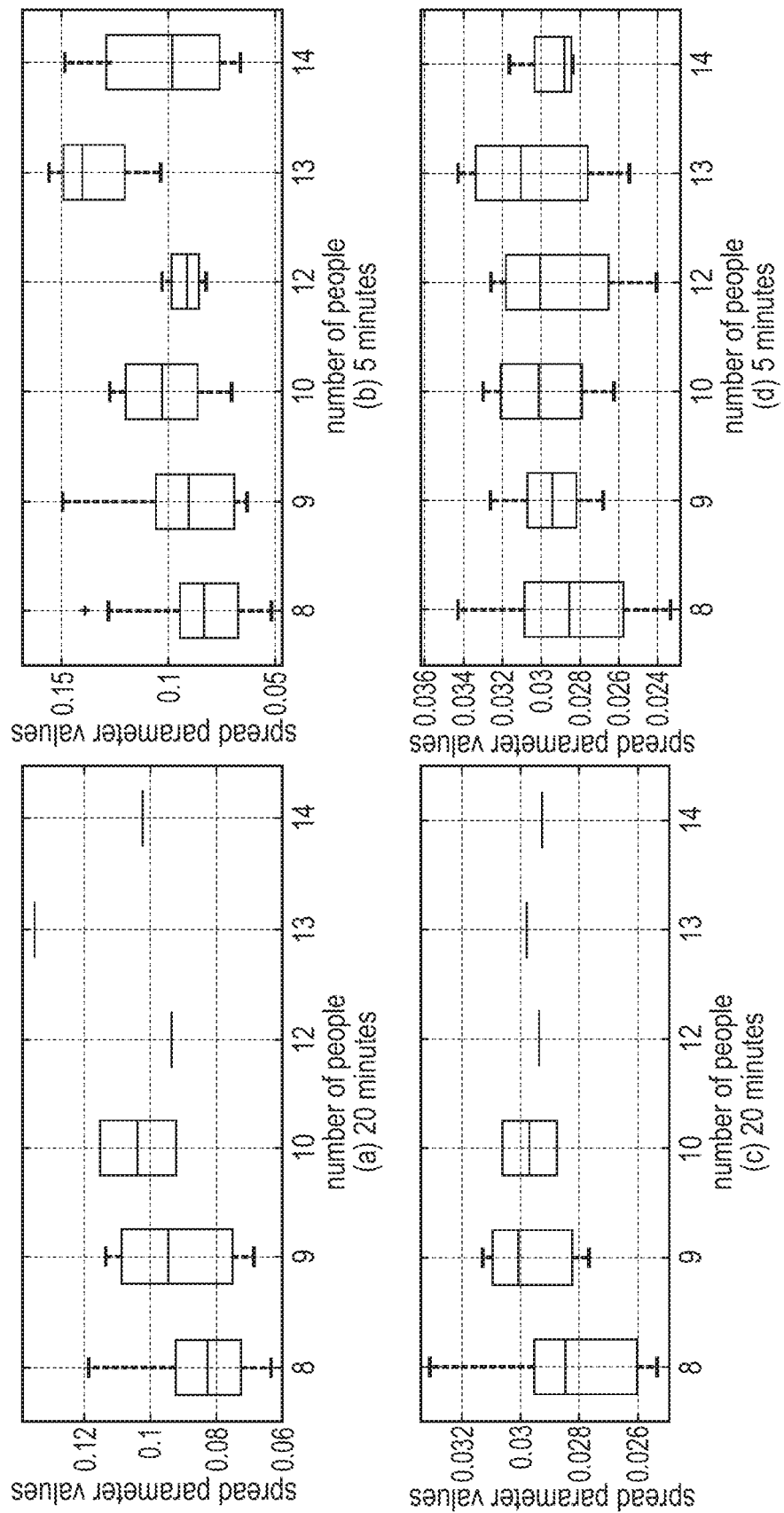
FIG. 15 illustrates box plots of spread parameters over meetings with numbers of occupants varying between 8 and 14.

For larger numbers of occupants which occlude each other, a Poisson log-linear regression model is found to provide the most accurate predictions. FIG. 15 shows box plots of the spread parameters over all meetings with number of occupants varying between 8 and 14. The predictive power of the Laplace parameters reduces in this high occupancy strata due to the reasons discussed above and the error of this approach for windows smaller than 5 minutes is substantial. In addition, the benefits of behaviour extraction stage are diminishing and regression on both Laplace parameters evaluated for both the raw data and "stabilized" Laplace parameters performs almost equally in terms of mean absolute error (MAE). The estimation accuracy within ±1 person and within ±2 can be found in Table 2.

Computational Efficiency

Practical applications of Bayesian probabilistic models such as the iHMM have been few largely due to the complex and computationally demanding inference algorithms involved for learning the parameters of such models. As a Bayesian nonparametric probabilistic model for time series data, the iHMM is no exception and careful consideration is needed to choose fitting procedures which are tractable for implementation in low-power embedded microcontroller hardware. The algorithms developed in this technique can be deployed in a resource constrained embedded system in which a microprocessor will take the data from the PIR sensor and run the algorithms to make occupancy prediction in a smart room context. The microprocessor makes the prediction in realtime at the end of every observation window, and therefore the performance of the algorithms is a relatively important factor. By way of example, several different iHMM inference algorithms may be used:

the beam sampler
[Van Gael et al., "Beam sampling for the infinite hidden markov model", *Proceedings of the 25th International Conference on Machine Learning*, pages 1088-1095. ACM, 2008], direct assignments Gibbs sampler
[Teh et al, "Hierarchical Dirichlet processes", *Journal of the American Statistical Association*, 101(476), 2006]

iterative maximum a posteriori (MAP) inference
[Raykov et al., "Iterative collapsed map inference for Bayesian nonparametrics, 2015].

Note that embodiments generally less interested in the quality of fit of the iHMM to the raw PIR sensor data than the prediction error of the regression component of the system using estimates of the "stabilized" Laplace parameters obtained using that iHMM, where the parameters have been estimated using different iHMM inference algorithms. This is because the preference is more about accurate estimates of human occupancy counting rather than learning the iHMM per se. We report the iterations that each inference algorithm required to convergence where an iteration consist of a full sweep through the training data and the model parameters. Computational price of a single iteration across algorithms is not equivalent, but for the chosen application is comparable.

Table 3 shows the mean absolute error (MAE, interquartile range in brackets) as a measure of occupancy count prediction accuracy using "stabilized" Laplace parameters from PIR data only for small motion behaviour clusters. Each column corresponds to iHMM clustering performed using a different inference algorithm. Last row shows speed comparison in terms of iterations to convergence.

TABLE 3

|  | Beam sampler | Gibbs sampler | Iterative MAP |
|---|---|---|---|
| 30 seconds | 0.95 (0.7) | 0.98 (0.8) | 0.99 (0.8) |
| 1 minute | 0.87 (0.7) | 0.89 (0.8) | 0.91 (0.7) |
| 2 minute | 0.79 (0.6) | 0.81 (0.7) | 0.84 (0.7) |
| 20 minute | 0.64 (0.6) | 0.72 (0.6) | 0.70 (0.7) |
| Iterations | 125 | 100 | 6 |

Theoretically, both beam and Gibbs sampler inference algorithms are guaranteed to converge on the optimal iHMM fit eventually. However, the stochastic nature of both samplers makes them highly computationally demanding and they can easily take two orders of magnitude more iterations to converge than iterative MAP. At convergence both stochastic algorithms will generally outperform iterative MAP in terms of iHMM parameter estimate accuracy, but we observe that the improvement due to better iHMM parameter estimates does not translate into sufficiently improved occupancy count to justify such large increase in computational effort over iterative MAP. Indeed, iterative MAP is simple enough that it can be used where computational resources are at a premium, as would be the case for our experimental setup using a microcontroller board.

Hence, as the most computationally intensive part of the suggested occupancy estimation tool is fitting the infinite hidden Markov model to cluster the raw PIR signal, in order for the system to be applicable and executable in low-power embedded microcontroller hardware, a learning procedure is chosen with consideration of the performance and computational efficiency. In the training phase the computational efficiency of the method is not as important and it is feasible to use external hardware to perform extensive computation. The challenge we face is how to later implement all of the information learned during the training phase, from many meetings (e.g. millions of training data points), into embedded microcontroller hardware. Furthermore, we would like to use efficiently this information and dynamically update it as new data becomes available.

In the training phase of the system, we use a Markov Chain Monte Carlo inference method to learn the parameters of the infinite hidden Markov model that best fits the training data, $x_1, \ldots, x_T$ (T is the number of training data points; K the number of clusters found during the training phase). The specific choice of a MCMC method is not essential here as when run to convergence, MCMC methods have guarantees to find the optimal parameterization (we also tested Beam sampling and Gibbs sampling). Once convergence is reached, we compute and store the non-collapsed infinite HMM model parameters. That is, the full form of infinite HMM is parameterized with a transition matrix $\pi$, emission parameters $\theta_1, \ldots, \theta_K$ and model hyperparameters $\{\theta_0, N_0\}$. At the end of the training phase, we use all the training data and the learned cluster indicators $z_1, \ldots, z_T$ to output the posterior transition matrix, emission parameters (the Laplace parameters for each cluster) and the prior hyperparameters. In the testing phase we use only those parameter values and we no longer need to store actual training data (T) used, which can be millions of data points. We parameterize an infinite Hidden Markov Model to incorporate those parameter values (i.e. posterior transition matrix, emission parameters and hyperparameters), which is only a few hundreds and they do not depend on the size of the training data, and then we proceed to the test phase.

In the test phase, the system receives the latest PIR output for a short period of time (e.g. 30 seconds, 1 minute, etc. as discussed). The test data is modelled with the help of the infinite hidden Markov model learned during training with an additional random part that we infer from the new test data. That is the infinite HMM model we use at this stage comprises a fixed part incorporating information from training and a random part which adapts only to the newly seen test data. Conditioned on the fixed part, random part of the model is inferred from the data. In contrast to the model learned in the training phase, the model we learn in the test phase depends not only on the data and the hyperparameters, but also proportionally on the training parameters. If the training data T>>T* (test data), then the infinite HMM that we fit to the test data will be really similar to the one we learn during training as number of test points is significantly less than the training points. The fixed part of the model is not updated before we finish processing the latest PIR segment and consists of the posterior transition matrix, emission parameters and prior hyperparameters learned in the training stage. Once the latest PIR segment has been processed, we can update the training parameters to incorporate the new data updating the model to adapt to the newly seen data. That is, the test transition matrix $\pi^*$ and emission parameters $\theta^*_1, \ldots \theta^*_K$ replace the training transition matrix $\pi$ and emission parameters $\theta_1, \ldots, \theta_K$ for the next PIR output tested.

The test phase uses an iterative procedure different to the procedure used during the training phase. In particular, an iterative Maximum-a-posteriori inference method may be used which is faster and more computationally efficient than the MCMC, Beam Sampling or Gibbs sampling techniques used in the training phase (see table 3 above). Hence, by using different inference techniques in training and test phases, the higher predictive accuracy of the more computationally intensive MCMC, Beam Sampling or Gibbs sampling technique can be achieved during training when computational efficiency is not an issue, but when the device continues to adapt the model in the test phase when used in practice, the more efficient iterative MAP approach provides improved memory efficiency and reduced runtime.

Discussion

Type of the PIR Sensor

In this study we recorded data from PIR sensors of standard and small motion detection types, where the reported results were obtained using the standard type. The standard sensor shows to be more promising then the small motion detector mostly due to the larger field of view. The small motion sensor does not cover all of the monitored room with only 2 m range and occupants seated in particular areas of the monitored room cannot be seen by the sensor. The accuracy of the occupancy count system would benefit from exploring additional types of PIR sensors with more sensitivity, range and wider field of view. Further, installing a second PIR sensor on the opposite side of the room and analyzing the output of the two jointly may help to address both the problem of mutual occlusion of the sensor by the occupants, and the problem of limited field of view. Nevertheless, use of a single PIR sensor has been shown to be sufficient for providing a reasonable estimate of the number of occupants. While the above examples discuss the technique in the context of a PIR sensor, as discussed above the technique could also be applied to other types of motion sensor such as an active infrared, ultrasonic or microwave motion sensor.

Position of the Sensor

The prototype sensor board was placed on a table positioned approximately in the middle of the room next to the wall. The table was part of the chosen office room furniture and as a result its height varied slightly in the different meeting rooms. The results did not seem to be influenced by the exact height of the table, but placing the sensor on one particular side of the room led to occupants occluding each other during more populated meetings (typically with 8 or more people). This problem can be easily addressed by using different positions of the PIR sensor; e.g. the ceiling of the room. While this would make the installation of the system more challenging, it is likely to lead to a consistent improvement of accuracy due to the clear unobstructed view of all the occupants that the sensor will be afforded in this physical configuration. In addition, PIR sensors installed on the ceiling are likely to increase the maximum distinguishable occupancy count. The accuracy of the system and its invariance to sensor location and position can additionally be improved with more training data accounting for different physical configuration scenarios.

Behaviour Modelling

In the current implementation, the key assumption made is that small movement patterns will describe better the number of people in a room, as they are less intentional and are independent of the nature of the meetings. We expect this assumption to hold in most human counting scenarios and no additional information about the nature of the meeting has been incorporated. In effect, we have sacrificed some of the predictive accuracy to obtain a generally applicable human occupancy counting system. Where additional information is available about the behaviour of the monitored occupants, incorporating this information into our probabilistic model will most likely improve the accuracy of the system and may even help us address other problems different from that of occupancy counting. For example, if we assume that we are monitoring conference meetings with duration of 1 hour starting on the hour, we would immediately know that occupancy changes occur only once every hour and we can use the whole hour PIR data to improve our predictions.

Summary

This study has demonstrated the potential of using a single passive infrared (PIR) sensor for more complex tasks than motion detection. We demonstrate how such a simple sensor combined with "intelligent" machine learning models can be utilised to solve the more complex problem of counting occupants in a room. While the accuracy of the proposed system does not yet reach the current state of the art obtainable with stereo cameras and computationally demanding image processing algorithms (or multisensor devices), our approach shows the ability to count the number of room occupants to within ±1 individual while substantially reducing the hardware costs, computational power and the need for specialist installation. Applications where accuracy is not critical, for instance, optimizing energy usage in buildings, can benefit from this cost-effective and easy to deploy approach. To our knowledge, this is the first attempt at designing a human occupancy counting system using a single, low-cost PIR sensor.

Some examples may also provide a system comprising:

means for sensing infrared radiation from a region and outputting a series of passive infrared (PIR) sensor values over a period of time; and means for determining a spread parameter indicative of a spread of the PIR sensor values detected over said period of time, and in dependence on said spread parameter, estimating a number of occupants in the region.

Also, an apparatus may be provided comprising:

at least one motion sensor to sense motion in a region and to output a series of sensor values over a period of time; and processing circuitry to determine a spread parameter indicative of a spread of the sensor values detected over said period of time, and in dependence on said spread parameter, to estimate a number of occupants in the region Also, some examples may provide a method of estimating a number of occupants in a region based on a series of passive infrared (PIR) sensor values detected over a period of time by a single PIR sensor positioned to sense infrared radiation in the region.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for quantitatively estimating a number of occupants in a region, comprising:
    detecting with at least one motion sensor a series of sensor values over a period of time,
    wherein the at least one motion sensor comprises a passive infrared (PIR) sensor for detecting the sensor values indicative of infrared radiation in said region;
    using processing circuitry, determining a spread parameter indicative of a spread of the sensor values detected over said period of time, wherein the spread parameter is indicative of a spread of a probability distribution corresponding to the sensor values detected over said period of time, said spread of the probability distribution indicative of a width of a distribution of frequencies of occurrence of different sensor values within said series of sensor values detected over said period of time; and
    using processing circuitry, determining, when the region is occupied by at least one occupant, a quantitative estimate of the number of occupants in the region in dependence on said spread parameter.

2. The method of claim 1, wherein the probability distribution comprises a Laplace distribution.

3. The method of claim 1, comprising, for each of a plurality of windows of time, estimating the number of occupants in dependence on the sensor values.

4. The method of claim 1, wherein the number of occupants is estimated by applying a regression model to map the spread parameter to the number of occupants.

5. The method of claim 4, comprising selecting, in dependence on the spread parameter or a previously estimated number of occupants of the region, one of a first regression model and a second regression model for mapping the spread parameter to the estimated number of occupants.

6. The method of claim 5, wherein the first regression model is selected when the spread parameter or the previously estimated number of occupants is less than a predetermined threshold, and the second regression model is selected when the spread parameter or the previously estimated number of occupants is greater than the predetermined threshold.

7. The method of claim 5, comprising estimating the number of occupants for each of a plurality of windows of time in dependence on the sensor values detected during the corresponding window of time;
   in response to detecting that the number of occupants estimated using the first regression model is greater than a first threshold number of occupants for more than a first number of previous windows of time, switching to using the second regression model for a subsequent window of time; and
   in response to detecting that the number of occupants estimated using the second regression model is less than a second threshold number of occupants for more than a second number of previous windows of time, switching to using the first regression model for a subsequent window of time.

8. The method of claim 5, wherein the first regression model comprises a linear regression model.

9. The method of claim 5, wherein the second regression model comprises a log-linear regression model.

10. The method of claim 1, comprising excluding selected sensor values from the determination of the spread parameter.

11. The method of claim 1, comprising clustering segments of the sensor values into a plurality of clusters, and excluding segments of the sensor values corresponding to one or more selected clusters from the determination of the spread parameter.

12. The method of claim 11, wherein the clustering is performed using a model obtained by machine learning based on training data.

13. The method of claim 12, comprising adapting the model in response to the sensor values detected by the at least one motion sensor in a period of time for which the number of occupants is being estimated.

14. The method of claim 13, wherein the machine learning based on the training data uses a first inference technique; and
   said adapting the model in response to the sensor values uses a second inference technique.

15. The method of claim 14, wherein the first inference technique comprises a Markov Chain Monte Carlo inference technique, Beam sampling inference technique or Gibbs sampling inference technique; and
   the second inference technique comprises an iterative Maximum-a-posteriori inference technique.

16. The method of claim 12, wherein the model comprises one of:
   a Hidden Markov Model, and
   an infinite Hidden Markov Model.

17. The method of claim 1, wherein said at least one motion sensor comprises a single motion sensor.

18. A data processing apparatus comprising a circuitry configured to perform the method of claim 1.

19. A non-transitory computer-readable storage medium storing a computer program to control a data processing apparatus to perform the method of claim 1.

20. The method of claim 1, wherein said sensor values detected by the PIR sensor are not attributed to any particular spatial position within the region.

21. The method of claim 1, comprising controlling a device using the quantitative estimate of the number of occupants in the region.

22. The method of claim 1, comprising at least one of:
   controlling a lighting, heating or air conditioning system based on the quantitative estimate of the number of occupants in the region;
   controlling a burglar alarm system based on the quantitative estimate of the number of occupants in the region; and
   providing the quantitative estimate of the number of occupants in the region to an emergency responder in an emergency response scenario.

23. A system comprising:
   at least one motion sensor to detect motion in a region by detecting a series of sensor values over a period of time, wherein the at least one motion sensor comprises a passive infrared (PIR) sensor for detecting the sensor values indicative of infrared radiation in said region; and
   processing circuitry to determine a spread parameter indicative of a spread of the temporal series of sensor values detected over said period of time, wherein the spread parameter is indicative of a spread of a probability distribution corresponding to the sensor values detected over said period of time, said spread of the probability distribution indicative of a width of a distribution of frequencies of occurrence of different sensor values within said series of sensor values detected over said period of time, and in dependence on said spread parameter, to determine, when the region is occupied by at least one occupant, a quantitative estimate of a number of occupants in the region.

* * * * *